United States Patent
Hathorn et al.

(10) Patent No.: US 10,901,725 B2
(45) Date of Patent: *Jan. 26, 2021

(54) UPGRADE OF PORT FIRMWARE AND DRIVER SOFTWARE FOR A TARGET DEVICE

(71) Applicant: INTERNATIONAL BUSINESS MACHINES CORPORATION, Armonk, NY (US)

(72) Inventors: Roger G. Hathorn, Tucson, AZ (US); Steven E. Klein, Tucson, AZ (US); Mikel W. Welsh, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/006,702

(22) Filed: Jun. 12, 2018

(65) Prior Publication Data

US 2018/0293065 A1    Oct. 11, 2018

Related U.S. Application Data

(63) Continuation of application No. 14/870,554, filed on Sep. 30, 2015, now Pat. No. 10,031,741.

(51) Int. Cl.
*G06F 8/654* (2018.01)
*G06F 13/362* (2006.01)
(Continued)

(52) U.S. Cl.
CPC ............ *G06F 8/654* (2018.02); *G06F 13/362* (2013.01); *H04L 47/626* (2013.01); *G06F 8/65* (2013.01); *G06F 9/4411* (2013.01)

(58) Field of Classification Search
CPC . G06F 8/65; G06F 8/654; G06F 8/665; G06F 9/4411; G06F 13/362; H04L 47/626
(Continued)

(56) References Cited

U.S. PATENT DOCUMENTS 7,447,811 B2 * 11/2008 Bita et al. ........... G06F 11/1433
                                                717/168
8,375,385 B1 * 2/2013 Harel et al. ............... G06F 8/65
                                                717/173
(Continued)

FOREIGN PATENT DOCUMENTS

WO    WO2008142079    11/2008
WO    WO2008146534    12/2008
(Continued)

OTHER PUBLICATIONS

"Information Technology—Fibre Channel Protocol for SCSI, Fourth Version (FCP-4)", American National Standard T10 Project 1828-D, Revision 02b, Jan. 3, 2011, pp. 147.
(Continued)

*Primary Examiner* — Wei Y Zhen
*Assistant Examiner* — Mohammed N Huda
(74) *Attorney, Agent, or Firm* — Rabindranath Dutta; Konrad Raynes Davda & Victor LLP

(57) ABSTRACT

Processing of frames from a receive queue maintained by a port firmware of an embedded port of a host bus adapter is suspended via a request from a driver of the host bus adapter. New driver software is loaded for the host bus adapter and new port firmware is loaded in the embedded port, in response to the suspending of the processing of frames from the receive queue. The processing of frames from the receive queue is resumed via another request from the driver of the host bus adapter, in response to the loading of the new driver software and the new port firmware.

20 Claims, 16 Drawing Sheets

(51) Int. Cl.
*H04L 12/863* (2013.01)
*G06F 9/4401* (2018.01)
*G06F 8/65* (2018.01)

(58) Field of Classification Search
USPC .......................................................... 717/168
See application file for complete search history.

(56) References Cited

U.S. PATENT DOCUMENTS

| | | | |
|---|---|---|---|
| 8,397,092 | B2 | 3/2013 | Karnowski |
| 8,949,656 | B1 | 2/2015 | Ninan et al. |
| 10,013,386 | B2 | 7/2018 | Hathorn et al. |
| 10,031,741 | B2 | 7/2018 | Hathorn et al. |
| 10,031,742 | B2 | 7/2018 | Hathorn et al. |
| 2003/0212859 | A1 | 11/2003 | Ellis et al. |
| 2005/0021605 | A1 | 1/2005 | Davies et al. |
| 2006/0047879 | A1 | 3/2006 | Hack et al. |
| 2008/0091815 | A1 | 4/2008 | Rao |
| 2009/0252063 | A1 | 10/2009 | Owen et al. |
| 2010/0191723 | A1 | 7/2010 | Perez et al. |
| 2013/0007183 | A1 | 1/2013 | Sorenson et al. |
| 2013/0125107 | A1* | 5/2013 | Bandakka et al. ........ G06F 8/65 717/171 |
| 2013/0151646 | A1 | 6/2013 | Chidambaram et al. |
| 2013/0346667 | A1 | 12/2013 | Stroud et al. |
| 2014/0012414 | A1 | 1/2014 | Perez et al. |
| 2014/0254371 | A1 | 9/2014 | Chan et al. |
| 2014/0259000 | A1 | 9/2014 | Desanti et al. |
| 2015/0154017 | A1 | 6/2015 | Yuan et al. |
| 2015/0161391 | A1 | 6/2015 | Johnsen et al. |
| 2016/0092259 | A1* | 3/2016 | Mehta et al. ....... G06F 9/45558 718/1 |
| 2017/0006033 | A1* | 1/2017 | Stecher et al. ............ G06F 8/65 |
| 2017/0090899 | A1 | 3/2017 | Hathorn et al. |
| 2017/0090911 | A1 | 3/2017 | Hathorn et al. |
| 2017/0091136 | A1 | 3/2017 | Hathorn et al. |
| 2018/0239735 | A1 | 8/2018 | Hathorn et al. |
| 2018/0293065 | A1 | 10/2018 | Hathorn et al. |

FOREIGN PATENT DOCUMENTS

| | | |
|---|---|---|
| WO | WO2010014381 | 2/2010 |
| WO | WO2015088887 | 6/2015 |

OTHER PUBLICATIONS

Yang, et al., "Interoperability and Performance Analysis of IEC61850 Based Substation Protection System", World Academy of Science, Engineering and Technology, International Journal of Electrical, Computer, Energetic, Electronic and Communication Engineering vol. 7 No. 8, 2013, pp. 8.

"Fibre Channel Single-Byte Command Code Sets Mapping Protocol—5 (FC-SB-5)", Rev. 2.00, American National Standard for Information Technology, Mar. 26, 2013, pp. 269.

"DGS-1210 Series Gigabit Smart Switches with Fibre Uplinks", D-Link Corporation, May 2013, pp. 6.

"Fibre Channel Link Service (FC-LS-3)", Rev. 3.10, American National Standard for Information Technology, Feb. 1, 2014, pp. 207.

"Fibre Channel Framing and Signaling—4 (FC-FS-4)", Rev. 1.20, American National Standard for Information Technology, Jul. 21, 2015, pp. 463.

List of Patents or Patent Applications Treated as Related, dated Jun. 12, 2018, pp. 2.

U.S. Appl. No. 14/870,385, filed Sep. 30, 2015, by inventors R.G. Hathorn, B.W. Holley, and S.E. Klein.

U.S. Appl. No. 14/870,393, filed Sep. 30, 2015, by inventors C.S. Cardinell, R.G. Hathorn, S.E. Klein and B. Laubli.

U.S. Appl. No. 14/870,410, filed Sep. 30, 2015, by inventors C.S. Cardinell, R.G. Hathorn, S.E. Klein and B. Laubli.

U.S. Appl. No. 14/870,422, filed Sep. 30, 2015, by inventors M.P. Bendyk, C.S. Cardinell, R.G. Hathorn, and S.E. Klein.

U.S. Appl. No. 14/870,549, filed Sep. 30, 2015.

Office Action dated Jun. 30, 2017, pp. 17, for U.S. Appl. No. 14/870,549, filed Sep. 30, 2015.

Response dated Oct. 2, 2017, pp. 9, to Office Action dated Sep. 30, 2017, pp. 17, for U.S. Appl. No. 14/870,549, filed Sep. 30, 2015.

Notice of Allowance dated Feb. 23, 2018, pp. 20, for U.S. Appl. No. 14/870,549, filed Sep. 30, 2015.

U.S. Appl. No. 15/598,822, filed Apr. 20, 2018.

U.S. Appl. No. 14/870,554, filed Sep. 30, 2015.

Office Action dated May 31, 2017, pp. 28, for U.S. Appl. No. 14/870,554, filed Sep. 30, 2015.

Response dated Aug. 30, 2017, pp. 12, to Office Action dated May 31, 2017, pp. 28, for U.S. Appl. No. 14/870,554, filed Sep. 30, 2015.

Final Office Action dated Dec. 1, 2017, pp. 23, for U.S. Appl. No. 14/870,554, filed Sep. 30, 2015.

Response dated Mar. 1, 2018, pp. 15, to Final Office Action dated Dec. 1, 2017, pp. 23, for U.S. Appl. No. 14/870,554, filed Sep. 30, 2015.

Notice of Allowance dated Mar. 21, 2018, pp. 14, for U.S. Appl. No. 14/870,554, filed Sep. 30, 2015.

U.S. Appl. No. 14/870,569, filed Sep. 30, 2015.

Office Action dated May 17, 2017, pp. 29, for U.S. Appl. No. 14/870,569, filed Sep. 30, 2015.

Response dated Aug. 7, 2017, pp. 12, to Office Action dated May 17, 2017, pp. 29, for U.S. Appl. No. 14/870,569, filed Sep. 30, 2015.

Final Office Action dated Dec. 1, 2017, pp. 28, for U.S. Appl. No. 14/870,569, filed Dec. 30, 2015.

Response dated Mar. 1, 2018, pp. 15, to Final Office Action dated Dec. 1, 2017, pp. 28, for for U.S. Appl. No. 14/870,569, filed Sep. 30, 2015.

Notice of Allowance dated Mar. 21, 2018, pp. 14, for U.S. Appl. No. 14/870,569, filed Sep. 30, 2015.

U.S. Appl. No. 16/005,578, filed Jun. 11, 2018.

Preliminary Amendment dated Jun. 11, 2018, pp. 9, for U.S. Appl. No. 16/005,578.

Office Action dated Dec. 14, 2018, pp. 24, for U.S. Appl. No. 15/598,822.

Response dated Jan. 30, 2019, pp. 29, to Office Action dated Oct. 31, 2018, pp. 35, for U.S. Appl. No. 16/005,578.

Office Action dated Oct. 31, 2018, pp. 35, for U.S. Appl. No. 16/005,578.

Response dated Mar. 14, 2019, pp. 7, to Office Action dated Dec. 14, 2018, pp. 24, for U.S. Appl. No. 15/598,822.

RCE and Amendment dated Aug. 15, 2019, pp. 11, to Final Office Action dated May 15, 2019, pp. 36, for U.S. Appl. No. 16/005,578.

Final Office Action dated May 15, 2019, pp. 36, for U.S. Appl. No. 16/005,578.

Notice of Allowance dated May 31, 2019, pp. 12, for U.S. Appl. No. 15/598,822.

Response dated Feb. 5, 2020, pp. 10, to Office Action dated Nov. 5, 2019, pp. 33, for U.S. Appl. No. 16/005,578.

Office Action dated Nov. 5, 2019, pp. 33, for U.S. Appl. No. 16/005,578.

Amendment dated Aug. 15, 2019, pp. 11, to Final Office Action dated May 15, 2019, pp. 36, for U.S. Appl. No. 16/005,578.

Response dated Jul. 15, 2020, pp. 9, to Office Action dated Apr. 15, 2020, pp. 26, for U.S. Appl. No. 16/557,857.

Office Action dated Apr. 15, 2020, pp. 26, for U.S. Appl. No. 16/557,857.

Final Office Action dated Apr. 16, 2020, pp. 31, for U.S. Appl. No. 16/005,578.

Response dated Jun. 16, 2020, pp. 10, to Final Office Action dated Apr. 16, 2020, pp. 31, for U.S. Appl. No. 16/005,578.

Notice of Allowance dated Sep. 22, 2020, pp. 17, for U.S. Appl. No. 16/005,578.

List of Patents or Patent Applications Treated As Related, dated Oct. 22, 2020, pp. 2.

Final Office Action dated Nov. 3, 2020, pp. 17, for U.S. Appl. No. 16/557,857.

* cited by examiner

UPGRADE OF PORT FIRMWARE AND DRIVER SOFTWARE FOR A TARGET DEVICE

CROSS-REFERENCE TO RELATED APPLICATION

This application is a continuation of U.S. patent application Ser. No. 14/870,554, filed Sep. 20, 2015, which application is incorporated herein by reference in its entirety.

BACKGROUND

1. Field

Embodiments relate to the upgrade of port firmware and driver software for a target device.

2. Background

A storage controller may control access to storage for one or more host computational devices that may be coupled to the storage controller over a network. A storage management application that executes in the storage controller may manage a plurality of storage devices, such as disk drives, tape drives, flash drives, etc., that are coupled to the storage controller. A host may send Input/Output (abbreviated as I/O or IO) commands to the storage controller and the storage controller may execute the I/O commands to read data from the storage devices or write data to the storage devices.

A host bus adapter (HBA) may comprise a circuit board and/or integrated circuit based adapter that may include components such as a Fibre Channel interface chip, where the Fibre Channel interface chip may be referred to as an embedded port. The host bus adapter may provide I/O processing and provide physical connectivity for the storage controller to a storage area network (SAN), where the storage area network includes a Fibre Channel switched fabric. The storage controller (via the host bus adapter) may act as a target that receives I/O commands from the one or more host computational devices, where the one or more host computational devices act as initiators of the I/O commands.

Communication between the hosts and the storage controller may occur over a Fibre Channel (FC) network, where Fibre Channel refers to an integrated set of architectural standards for data transfer being developed by the American National Standards Institute. Fibre Channel is a high-speed network technology primarily used for storage area networks. Fibre Channel Protocol (FCP) is a transport protocol that predominantly supports transports commands over Fibre Channel networks.

Fibre Channel may be split into five layers: a Protocol-mapping layer (FC-4), a common service layer (FC-3), a network layer (FC-2), a data link layer (FC-1), and a FC-0 layer that defines the physical link in the system, including the fibre, connectors, optical and electrical parameters for a variety of data rates. Layers FC-0 through FC-2 are also known as FC-PH, the physical layers of Fibre Channel, whereas FC-3 and FC-4 layers define how Fibre Channel ports interact with applications in computational devices. The FC-3 layer of the FC standard is intended to provide the common services for features such as striping, multicasting, etc.

FC-4, the highest layer in Fibre Channel, defines application interfaces that execute over Fibre Channel. FC-4 specifies the mapping rules of upper layer protocols using the FC layers below. FC-4 is formed by a series of profiles that define how to map legacy protocols to Fibre Channel. Fibre Channel is capable of transporting both network and channel information, and profiles for network and channel protocols, such as, Small Computer System Interface (SCSI), Intelligent Peripheral Interface (IPI), High Performance Parallel Interface (HIPPI) Framing Protocol, Internet Protocol (IP), Link Encapsulation (FC-LE), Single-Byte Command Code Set Mapping (SBCCS), etc., may be specified or proposed as protocol mappings in FC-4.

Fibre Connection (FICON) is a protocol of the fibre channel architecture and may also be referred to by the formal name of FC-SB-5. FICON is a protocol layer that builds upon the Fibre Channel transport protocol. Further details of Fibre Channel protocol mapping for the Single-Byte Command Code Sets may be found in the publication, "Fibre Channel Single-Byte Command Code Sets Mapping Protocol—5 (FC-SB-5)", Rev. 2.0, published by the American National Standards Institute on Mar. 26, 2013.

The basic building blocks of a Fibre Channel connection are called "Frames". The frames contain the information to be transmitted (Payload), the address of the source (i.e., initiator) and destination (i.e., target) ports and link control information. Frames are broadly categorized as data frames and link control frames. Details of framing and signaling aspects of Fibre Channel may be found in the publication, "Fibre Channel Framing and Signaling—4 (FC-FS-4)", Rev. 1.20, published by the American National Standard for Information Technology on Jul. 21, 2015. Details of link services aspects of Fibre Channel may be found in the publication, "Fibre Channel Link Services (FC-LS-3)", Rev. 3.10, published by the American National Standard for Information Technology on Feb. 1, 2014. The Fibre Channel Protocol for SCSI Fourth Version (FCP-4) standard describes the frame format and protocol definitions required to transfer commands and data between a SCSI (Small Computer System Interface) initiator and target using the Fibre Channel family of standards. Further details of FCP-4 may be found in the publication, "Information Technology—Fiber Channel Protocol for SCSI, Fourth Version (FCP-4), Revision 02b" published by the International Committee for Information Technology Standards, on Jan. 3, 2011.

The storage controller may include a plurality of host bus adapters, where each host bus adapter may include a Fibre Channel Interface chip that is an interface to switches that allow communication over a Fibre Channel network between the storage controller and the plurality of hosts.

Fibre Channel storage area networks may use the Fibre Channel protocol (used by the hardware to communicate), the SCSI protocol (used by software applications to communicate to disks), and other protocols for communication. In Fibre channel, network connections are established between node ports (N_Ports) that are there in computers, servers, storage controllers, storage devices, printers, etc., and fabric ports (F_Ports) that are there in the Fibre channel switched fabric. A Fibre Channel switched fabric relies on one or more switches to establish direct, point-to-point connections between the source and target devices. Each Fibre Channel interface chip in the host bus adapters of the storage controller comprises a port that allows communication of the storage controller to the hosts over the Fibre Channel switched fabric.

Fibre Channel login takes place after a link is operational and the login may an extended link service protocol. Port login is a type of Fibre Channel login that is also known as PLOGI. Port login is used to establish a session between two N_Ports (devices) and is necessary before any upper level (i.e., upper layer) commands or operations can be performed. During the port login, two N_Ports (devices) swap service parameters and make themselves known to each other.

SUMMARY OF THE PREFERRED EMBODIMENTS

Provided are a method, a system, a computer program product in which processing of frames from a receive queue maintained by a port firmware of an embedded port of a host bus adapter is suspended via a request from a driver of the host bus adapter. New driver software is loaded for the host bus adapter and new port firmware is loaded in the embedded port, in response to the suspending of the processing of frames from the receive queue. The processing of frames from the receive queue is resumed via another request from the driver of the host bus adapter, in response to the loading of the new driver software and the new port firmware.

In additional embodiments, frame transmission by the embedded port to remote ports is allowed to continue while the processing of frames from the receive queue is suspended.

In further embodiments, runtime data is saved prior to loading the new driver software for the host bus adapter. Memory locations allocated for usage by the port firmware are preserved while loading the new driver software. The previously saved runtime data is restored, subsequent to the loading of the new driver software, and prior to the loading of the new port firmware.

In additional embodiments, prior to loading the new driver software and the new port firmware, the driver sends a message to the embedded port to release and free buffer queues that are used to store asynchronous receive data and command payloads for reallocation and resizing. The driver also sends one or more messages to the embedded port to delete additionally configured request and response queues for reallocation and resizing. Additionally, in response to loading the new driver software and the new port firmware, the driver sends a message to the embedded port to reallocate buffer queues and additional request and response queues.

In yet further embodiments, during the loading of the new driver software for the host bus adapter and the loading of new port firmware in the embedded port of the host bus adapter, remote ports remain logged in to the embedded port, and Input/Output operations are quiesced.

In certain embodiments, the embedded port is a Fibre Channel interface chip that includes port firmware that supports lower level Fibre Channel protocols, wherein the driver of the host bus adapter supports upper level Fibre Channel protocols.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In storage controllers, upgrading of firmware of an embedded port (EP) of a host bus adapter and driver software of the host bus adapter may need to be performed in a timely manner while minimizing the impact to actively running input/output (I/O) operations. It is also desirable to allow the system to resize or relocate data structures in the new firmware and/or software. Certain embodiments provide mechanisms to concurrently load the port firmware and driver software without dropping light on an optical link, such as a Fibre Channel link to a remote port. I/O operations are not lost during the concurrent loading of the port firmware and driver software and port logins are maintained.

In certain embodiments, through a driver initiated process, driver software and port firmware are upgraded concurrently in two communicating processors on a target device while avoiding the impact to currently active host I/O (e.g., I/O from a remote port) to the target (e.g., a host bus adapter). The upgrade procedure eliminates fabric login activity to avoid changes in the fabric, preserves external port firmware traces in host memory buffers, and enables structures in the driver to be relocated or resized. The upgrade stops reception of frames in a receive First In First Out (FIFO) queue and may then resume this FIFO queue within 500 ms to avoid dropped frames in the storage area network (SAN). In FIFO queueing, frames are buffered and forwarded in the order of arrival.

In certain embodiments, a driver sends a message to an embedded port to suspend the processing of frames while frame transmission by the embedded port to remote ports is allowed to continue. This allows the embedded port to continue to respond to already received I/O requests (and instructions from the driver) while new incoming requests are suspended. Fabric and port login states are saved, and new driver software is loaded while preserving memory locations allocated for usage by the port firmware. The fabric and port login states are restored, and new port firmware is loaded. Subsequently the processing of frames is continued. Remote ports that have previously logged on to the embedded port do not have to perform a new login even if the driver of the host bus adapter and the firmware of the embedded port are changed. The avoidance of new login operations may save a significant amount of time in Fibre Channel based communications in the computing environment.

Exemplary Embodiments

Figure 1:
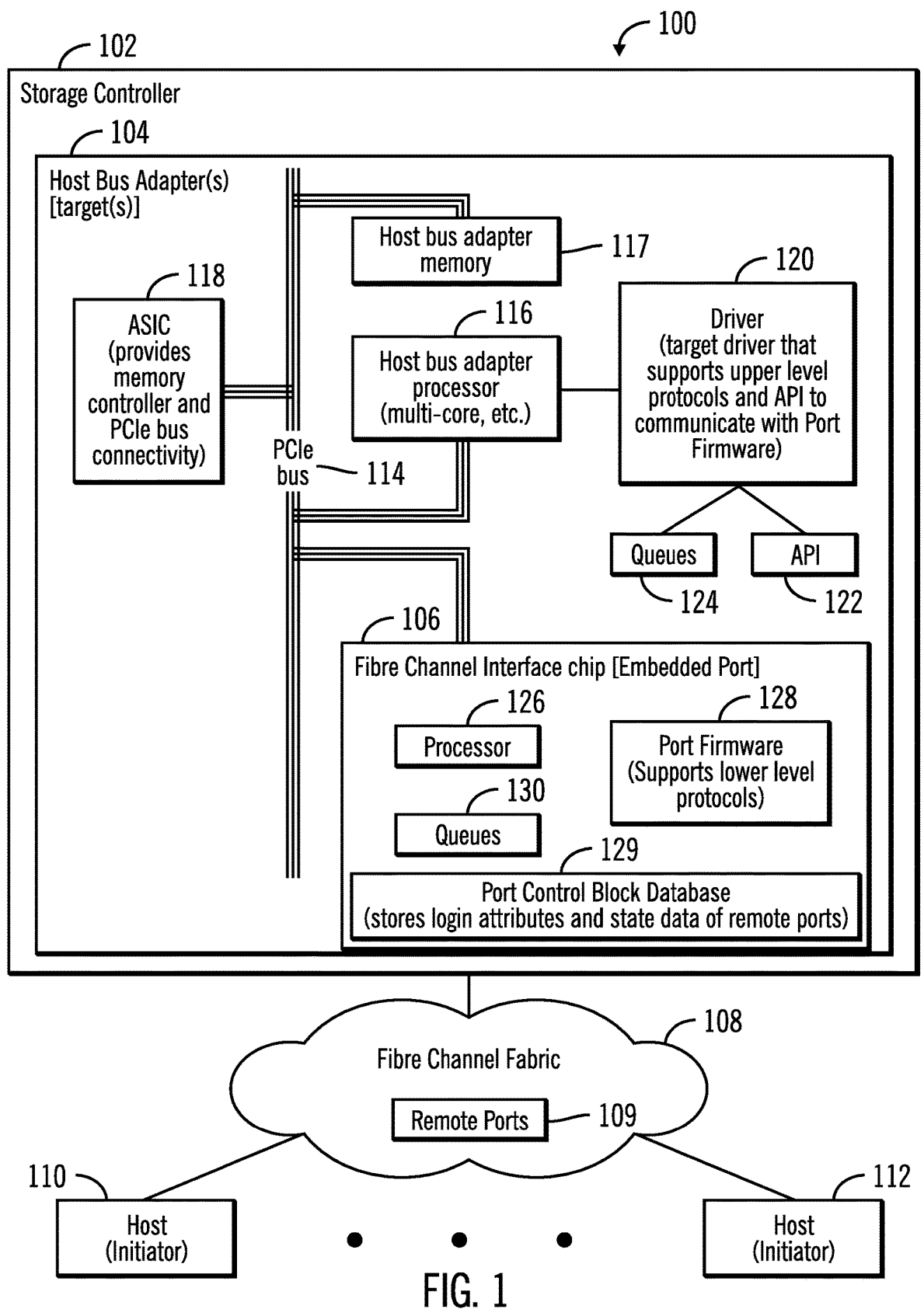
FIG. 1 illustrates a block diagram of a computing environment comprising a storage controller that includes one or more host adapters with one or more Fibre Channel interface chips to couple the storage controller to a Fibre Channel fabric to communicate with a plurality of hosts, in accordance with certain embodiments.

FIG. 1 illustrates a block diagram of a computing environment 100 comprising a storage controller 102 that includes one or more host adapters 104 with one or more Fibre Channel interface chips 106 to couple the storage controller 102 to a Fibre Channel fabric 108, to communicate with a plurality of hosts 110, 112, in accordance with certain embodiments.

The storage controller 102 that includes the host bus adapter 104 may control storage devices (not shown), and receive I/O commands from the hosts 110, 112. The storage controller 102 and the hosts 110, 112 may comprise any suitable computational device including those presently known in the art, such as, a personal computer, a workstation, a server, a mainframe, a hand held computer, a palm top computer, a telephony device, a network appliance, a blade computer, a processing device, etc. In certain embodiments the storage controller 102 may be comprised of one or more storage servers. A plurality of storage servers may provide redundancy because if one storage server undergoes a failure from which recovery is not possible, an alternate storage server may perform the functions of the storage server that failed. The storage controller 102 and the hosts 110, 112 may be elements in any suitable network, such as, a storage area network, a wide area network, the Internet, an intranet. In certain embodiments, the storage controller 102 and the hosts 110, 112 may be elements in a cloud computing environment.

In FIG. 1, the storage controller 102 may include one or more host bus adapters 104 that operate as targets of I/O operations initiated by one or more hosts 110, 112. The host bus adapter 104 does not have control over the arrival of host I/O operations. In certain embodiments, each host bus adapter 104 may be in the form of an adapter card that is plugged into the Peripheral Component Interconnect Express (PCIe) slot of the storage controller 102.

The host bus adapter 104 may include a PCIe bus 114 to which a host bus adapter processor 116, a host bus adapter memory 117, and the Fibre Channel interface chip 106 are coupled. An ASIC 118 may reside in the host bus adapter 104, where the ASIC 118 provides a memory controller and PCIe bus connectivity.

The host bus processor 116 may be a single-core or a multi-core processor. A driver 120 that supports upper level protocols e.g., FCP, FICON, FC-4 layer standards, etc., executes operations on the host bus adapter processor 116. In certain embodiments, the driver 120 may be included in the host bus adapter 104 or may execute as a process in the storage controller 102 to which the host bus adapter 104 is coupled. The host bus adapter memory 117 may comprise any suitable memory known in the art such as a Random Access Memory (RAM), a dynamic RAM (DRAM), flash memory, etc. The driver 120 communicates with the Fibre Channel interface chip 106 by using an application programming interface (API) 122. Various data structures, such as queues 124 are maintained by the driver 120. In certain embodiments, the driver 120 may be implemented in software, hardware, firmware or any combination thereof.

The Fibre Channel Interface Chip 106 is also referred to as an embedded port. The embedded port 106 includes a processor 126 and a port firmware 128 that supports lower level protocols like those for framing, signaling, etc. In certain embodiments, functions of the port firmware 128 may be implemented in software, hardware, firmware or any combination thereof. Various data structures, such as queues 130 (e.g., request queues) are maintained by the port firmware 128. The embedded port 106 supports lower level protocols of Fibre Channel and the driver 120 supports upper level protocols. The embedded port 106 that supports lower level protocols of Fibre Channel connects the host bus adapter 104 to the Fibre Channel fabric 108.

The embedded port 106 includes a port control block database 129 that is maintained by the port firmware 128. The port control block database 129 stores login attributes and state data of remote ports 109 (in the Fibre Channel Fabric 108) that may have logged in to the embedded port 106.

The hosts 110, 112 may send I/O commands to the storage controller 102 over the Fibre Channel fabric 108. The embedded port 106 receives the Fibre Channel frames corresponding to the request. The driver 120 which supports upper level protocols of Fibre Channel is in communication with the embedded port 106. The driver 120 uses the embedded port 106 and communicates via the upper level protocols with the hosts 110, 112, and responds to I/O commands via the embedded port 106.

Therefore, FIG. 1 illustrates certain embodiments in which a driver 120 of a host bus adapter 104 in association with the port firmware 128 of an embedded port 106 allows the host bus adapter 104 to process and respond to I/O commands from one or more hosts 110, 112. In certain situations the driver 120 and the port firmware 128 may need to be updated without logging out remote ports 109 that may have logged in to the embedded port 106 to perform I/O, and certain embodiments provide mechanisms to perform such updates of the driver 120 and the port firmware 128.

Figure 2:
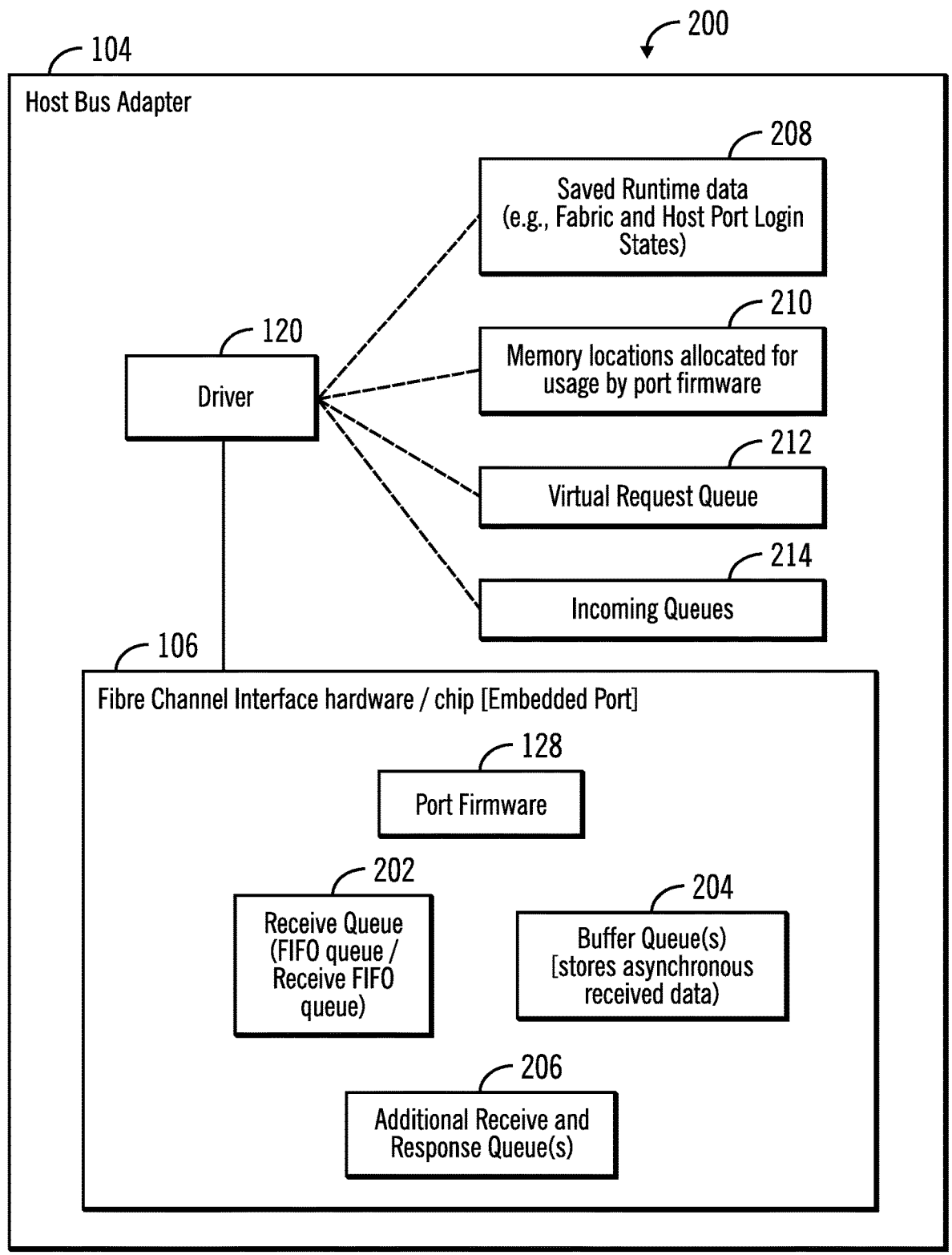
FIG. 2 illustrates a block diagram of a host bus adapter including a driver and a Fibre Channel Interface hardware that operates as an embedded port, in accordance with certain embodiments.

FIG. 2 illustrates a block diagram 200 of host bus adapter 104 including the driver 120 and the Fibre Channel Interface chip (hardware) 106 that operates as an embedded port 106, in accordance with certain embodiments.

The embedded port 106 may include the port firmware 128 that may need to be changed. The port firmware 128 may maintain various data structures that may include a receive queue 202 comprising a First In First Out (FIFO) queue (also referred to as a receive FIFO queue) that stores incoming frames, a buffer queue 204 that stores asynchronously received data, and additional receive and response queues 206.

Also maintained in the host bus adapter 104 are saved runtime data 208 corresponding to fabric and host port login states, memory locations 210 from the host bus adapter memory 117 that have been allocated for usage by the port firmware 128, virtual request queues 212, and incoming queues 214. The data structures 202, 204, 206, 208, 210, 212, 214 may be implemented differently in certain alternative embodiments and may be maintained in other locations besides those shown in FIG. 2.

Figure 3:
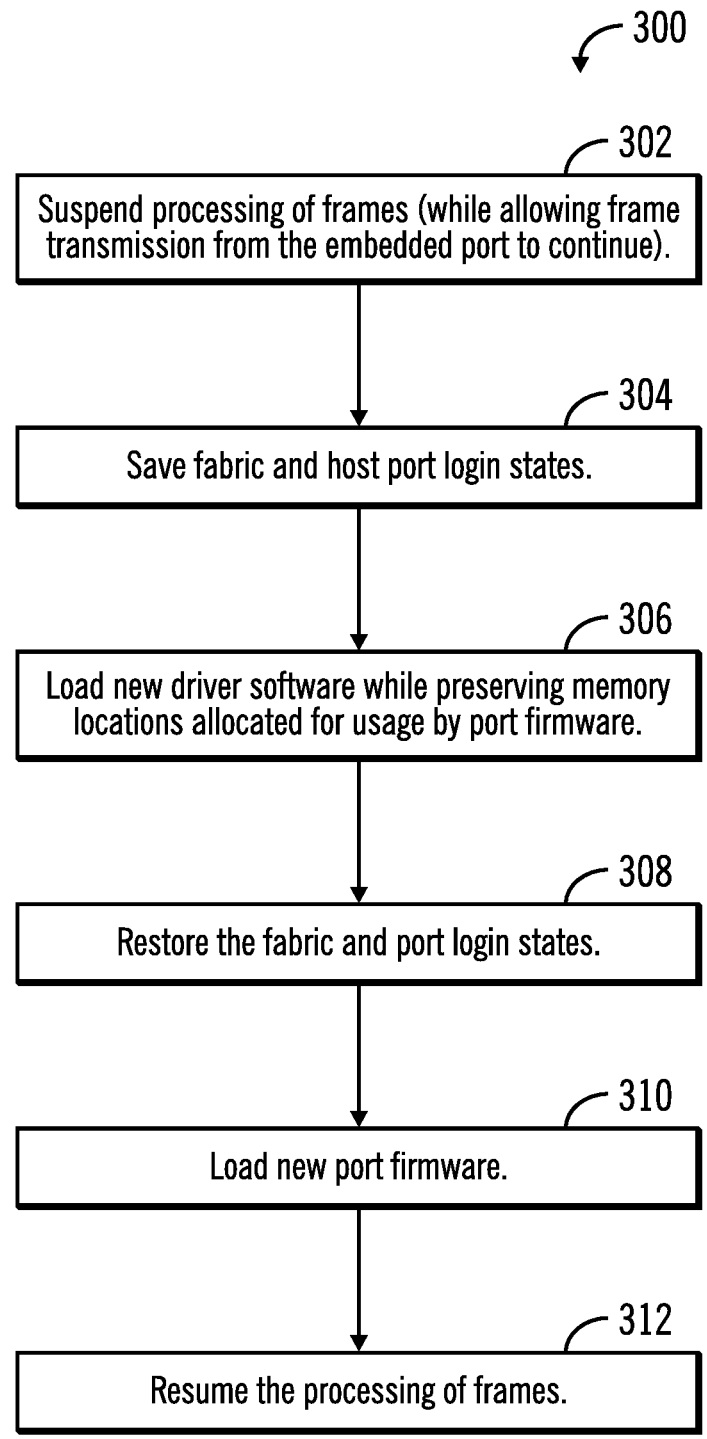
FIG. 3 illustrates a first flowchart that show operations performed in a system that has an embedded port, in accordance with certain embodiments.

FIG. 3 illustrates a first flowchart 300 that show operations performed in a system that has an embedded port 106, in accordance with certain embodiments.

In certain embodiments, control starts at block 302 in which a driver 120 interacts with the embedded port 106 to cause the suspension of the processing of frames while allowing frame transmission from the embedded port 106 to continue. Fabric and login states of the Fabric 108 and the remote ports 109 are saved by the driver (at block 304), and new driver software is loaded (at block 306) while preserving memory locations allocated for usage by the port firmware 128. The fabric and port login states that were saved in block 304 are restored (at block 308), and new port firmware is loaded (at block 310). Subsequently the processing of frames is resumed (at block 312). Remote ports 109 that have previously logged on to the embedded port 106 do not have to perform a new login even if the driver 120 of the host bus adapter 104 and the firmware 128 of the embedded port 106 are changed.

Figure 4:
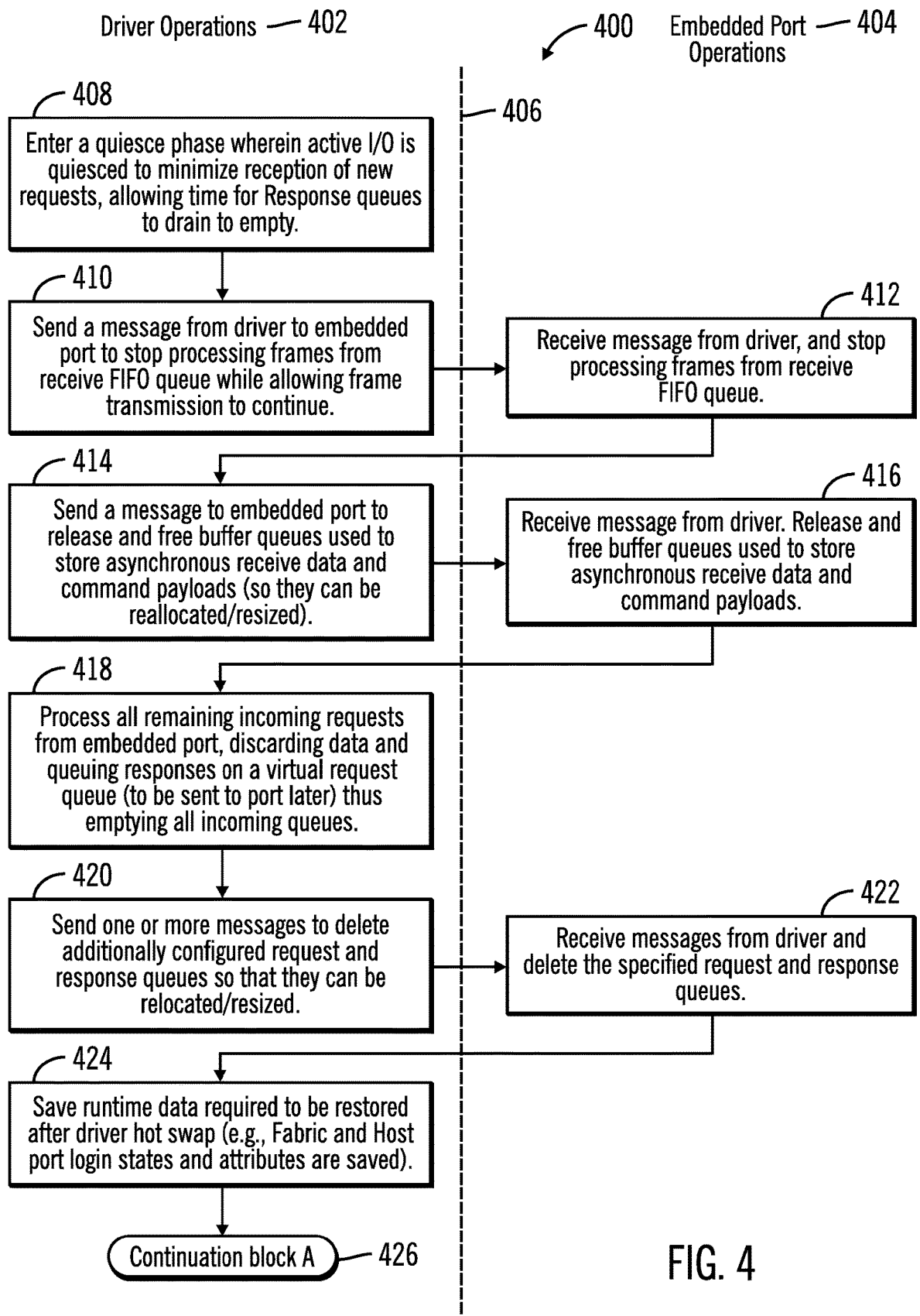
FIG. 4 illustrates a second flowchart that shows operations of a driver of the host bus adapter and an embedded port, in accordance with certain embodiments.

FIG. 4 illustrates a second flowchart 400 that shows operations of a driver 120 of the host bus adapter 104 and an embedded port 106, in accordance with certain embodiments. The driver operations 402 and the embedded port operations 404 are shown to the left and right of the dashed line 406 respectively.

Control starts at block 408, in which the driver 402 performs operations for I/O operations to enter a quiesce phase, in which active I/O is quiesced (suspended) to minimize reception of new requests, and as a result allowing time for response queues to drain to empty.

Control proceeds to block 410 in which the driver 120 sends a message to the embedded port 106 to stop processing frames from receive queue 202 (also referred to as FIFO queue or receive FIFO queue) while allowing frame transmission from the embedded port 106 to the remote ports 109 to continue. This allows the embedded port 106 to continue to respond to already received I/O requests (and instructions from the driver 120) while the processing of frames from the receive queue 202 is suspended (i.e., new incoming requests are suspended). Remote ports 109 may send frames up to the point where the receive queue 202 is full and buffer credit runs out. The embedded port 106 receives (at block 412) the message from the driver 120, and stops processing frames from the receive queue 202.

Control proceeds to block 414, in which the driver 120 sends a message to the embedded port 106 to release and free buffer queues 204 used to store asynchronous receive data and command payloads (so that the asynchronous receive data can be reallocated or resized).

The embedded port 106 receives (at block 416) the message from the driver 120, and releases and frees the buffer queues 204 used to store asynchronous receive data and command payloads.

Control proceeds to block 418 in which the driver 120 processes all remaining incoming requests from the embedded port 106, and discards data and queuing responses on a virtual request queue 212 (to be sent to the embedded port 106 later) thus emptying all incoming queues 214.

The driver 120 sends (at block 420) one or more messages to the embedded port 106 to delete additionally configured request and response queues 206 so that the additionally configured request and response queues 206 may be relocated or resized. The embedded port 106 receives the one or more messages from the driver 120 and deletes (at block 422) the specified request and response queues.

Control proceeds to block 424 in which the driver 120 saves runtime data that should be restored after a hot swap of the driver (e.g., a driver upgrade). The saved runtime data may include fabric and host port login states and attributes. For example, the login states and attributes of the remote ports 109 that have logged in to the embedded port 106 of the host bus adapter 104 may be saved. From block 424 control proceeds to continuation block A 426 that shows continuation of operations in a subsequent flowchart.

Figure 5:
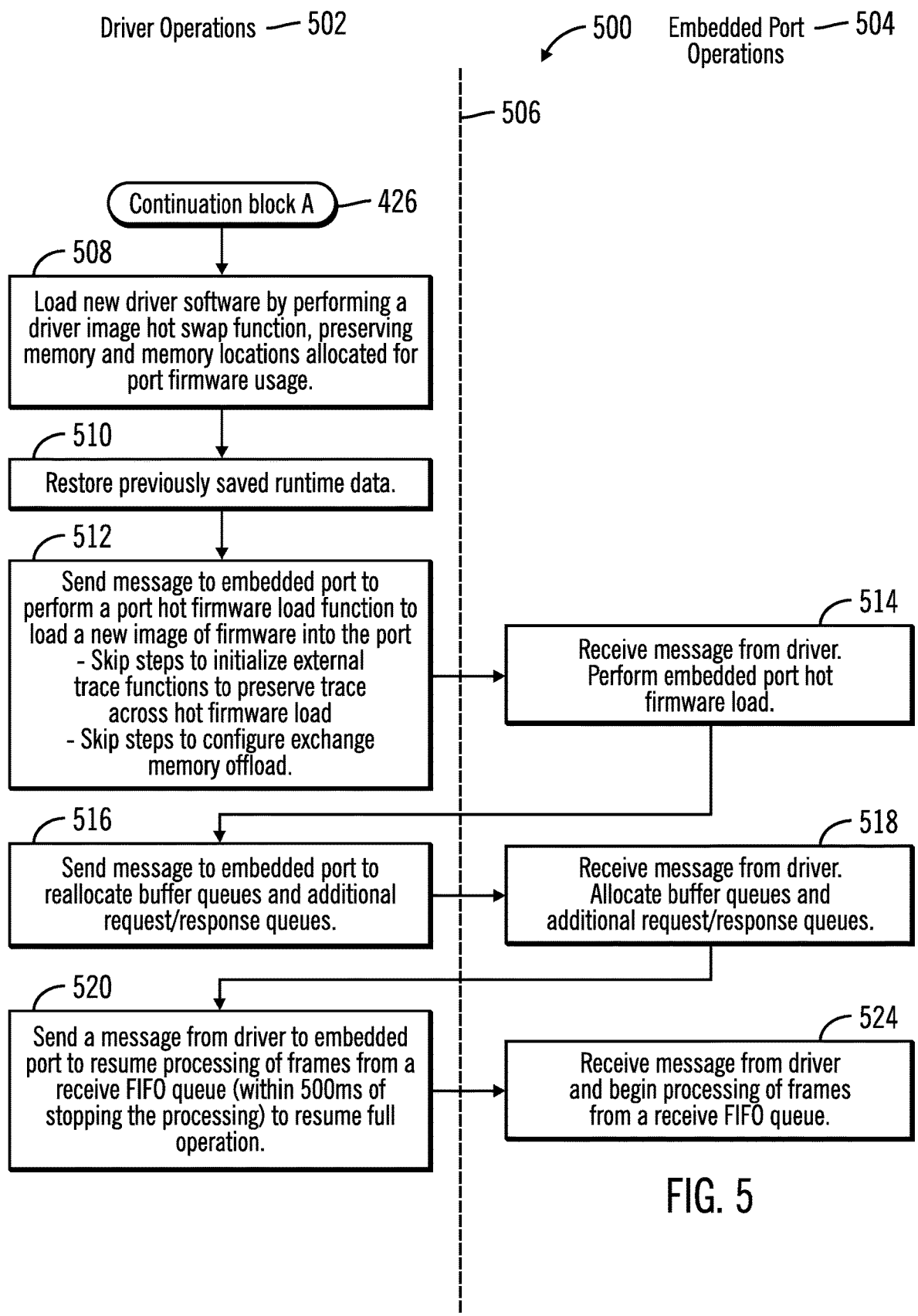
FIG. 5 illustrates a third flowchart that shows operations of a driver of the host bus adapter and an embedded port, in accordance with certain embodiments.

FIG. 5 illustrates a third flowchart 500 that shows operations of a driver 120 of the host bus adapter 104 and an embedded port 106, in accordance with certain embodiments. The driver operations 502 and the embedded port operations 504 are shown to the left and right of the dashed line 506 respectively.

From continuation block A 426, control proceeds to block 508 in which new driver software is loaded by performing a driver image hot swap function, while preserving memory and memory locations allocated for use by the port firmware 128. The new driver that is loaded restores (at block 510) the previously saved runtime data and sends (at block 512) a message to the embedded port 106 to perform a port hot firmware load function to load a new image of firmware into the embedded port 106. Steps to initialize external trace functions are skipped to preserve trace across the hot firmware load. Also skipped are operations to configure exchange memory offloads.

Control proceeds to block 514, in which the embedded port 106 receives the message from the driver 120. The embedded port 106 performs (at block 514) a hot firmware load.

The driver 120 then sends (at block 516) a message to the embedded port 106 to reallocate buffer queues 204 and additional request and response queues 206. The embedded port 106 receives (at block 518) the message from the driver 120 and allocates buffer queues and additional request and response queues.

Control proceeds to block 520 in which the new driver sends a message to the embedded port 106 to resume processing of frames from the receive FIFO queue 202 (within 500 ms of stopping the processing of frames at blocks 408-412) to resume full operation. The embedded port 106 receives (at block 524) the message from the new driver and begins processing of frames from the receive FIFO queue 202.

Figure 6:
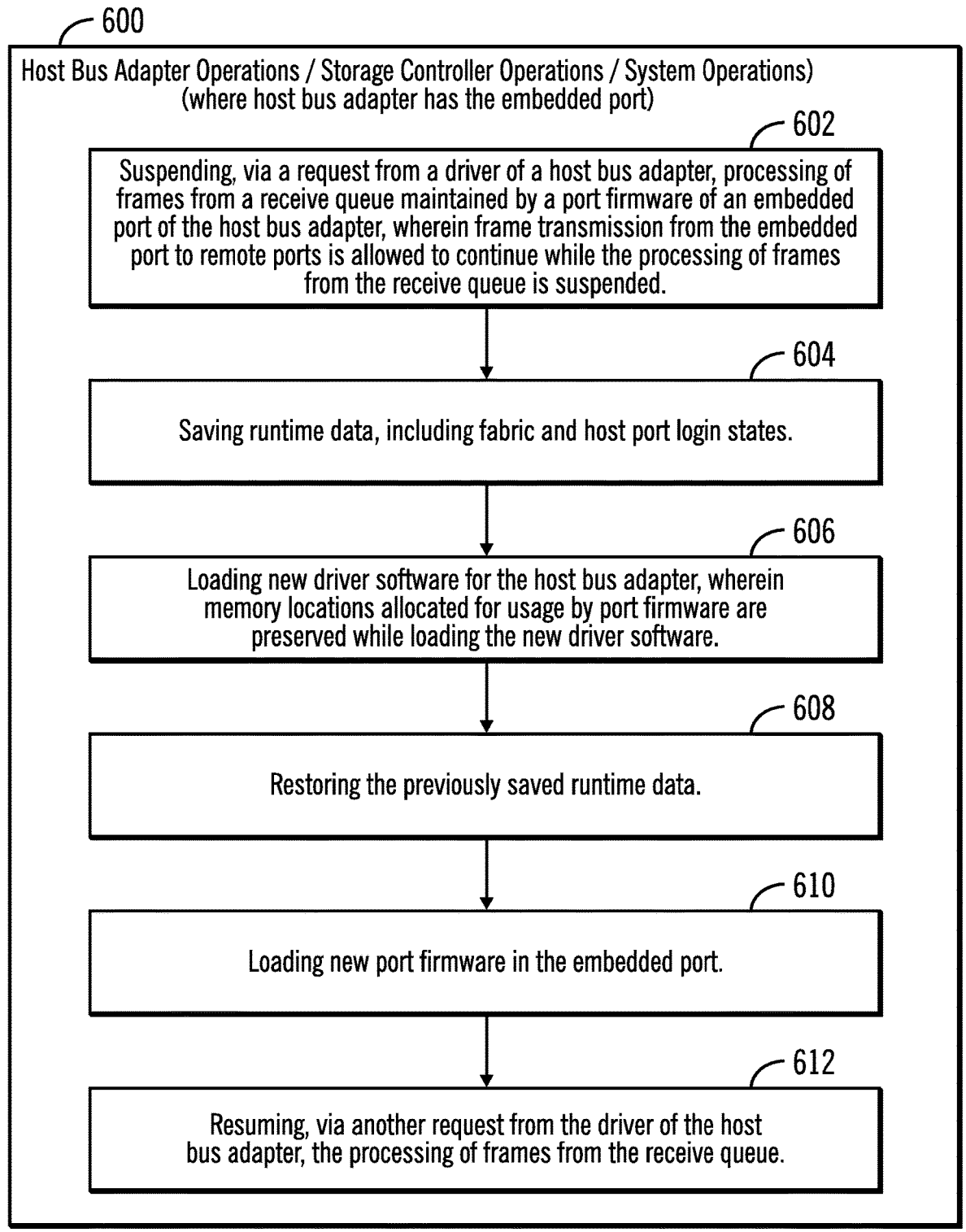
FIG. 6 illustrates a fourth flowchart that shows operations of a host bus adapter, a device, a storage controller, or a system that includes an embedded port, in accordance with certain embodiments.

FIG. 6 illustrates a fourth flowchart 600 that shows operations of a host bus adapter, a device, or a system that includes an embedded port 106, in accordance with certain embodiments. The operations shown in the fourth flowchart 600 may also be performed by the storage controller 102 or by another system that has a processor and a memory.

Control starts at block 602, in which processing of frames from a receive queue maintained by a port firmware 128 of an embedded port 106 of a host bus adapter 104 is suspended, via a request from the driver 120 of the host bus adapter 104, wherein frame transmission from the embedded port 106 to remote ports 109 is allowed to continue while the processing of frames from the receive queue 202 (e.g., the FIFO queue 202) is suspended. Runtime data, including fabric and host port login states are saved (in block 604). In certain embodiments, the saved runtime data includes fabric and host port login states.

New driver software is loaded (at block 606) for the host bus adapter 104, wherein memory locations allocated for usage by the port firmware 128 are preserved while loading the new driver software. The new driver then restores (at block 608) the previously saved runtime data, including fabric and host port login states. New port firmware is loaded (at block 610) in the embedded port 106, and the processing of frames from the receive queue 202 is resumed (at block 612), via another request from the driver 120 of the host bus adapter 104.

Figure 7:
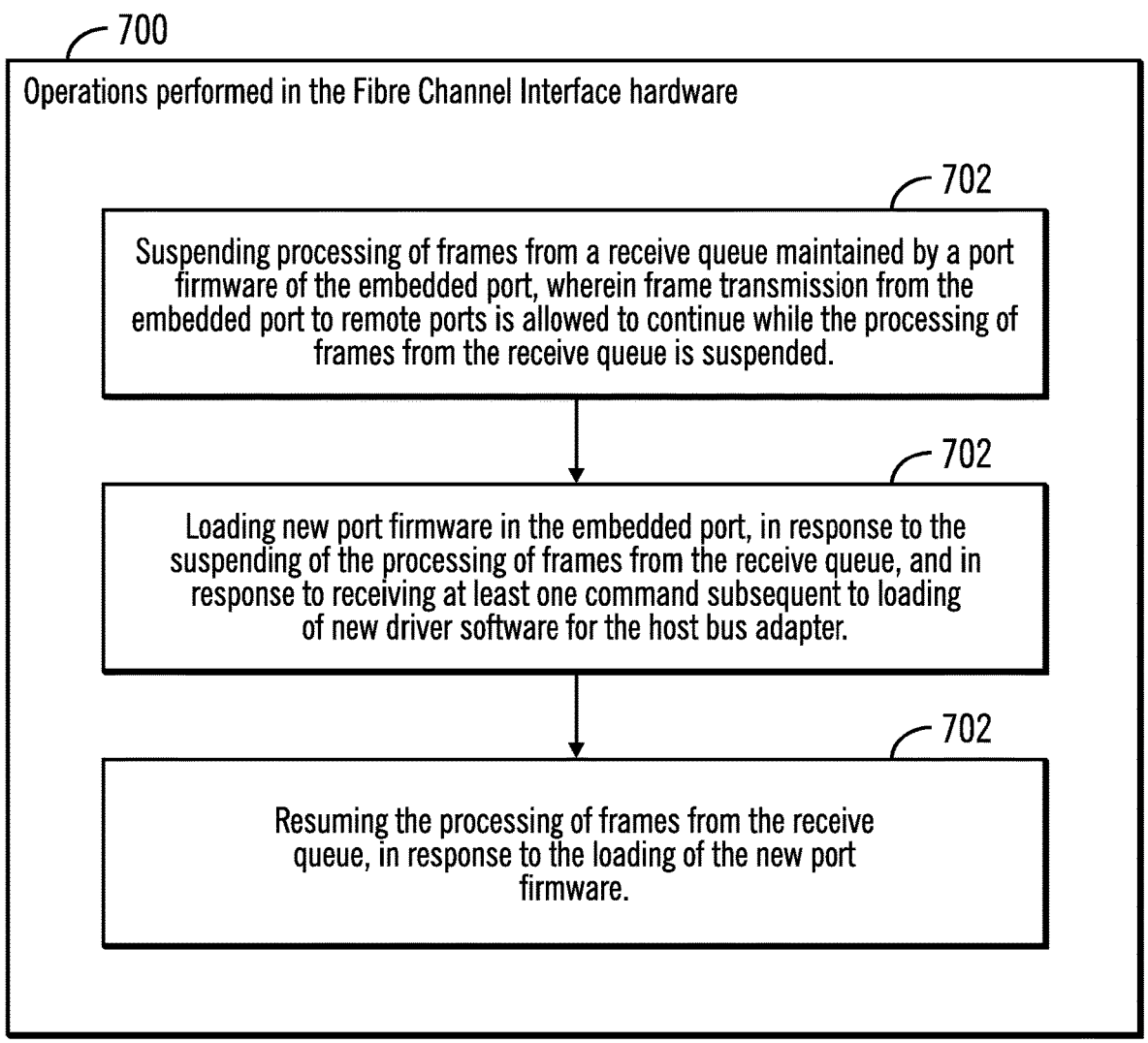
FIG. 7 illustrates a fifth flowchart that shows operations of a Fibre Channel Interface hardware that operates as an embedded port, in accordance with certain embodiments.

FIG. 7 illustrates a fifth flowchart 700 that shows operations of a Fibre Channel Interface hardware 106 that operates as an embedded port 106, in accordance with certain embodiments.

Control starts at block 702 in which the embedded port 106 suspends processing of frames from a receive queue 202 maintained by a port firmware 128 of the embedded port 106, wherein frame transmission from the embedded port 106 to remote ports 109 is allowed to continue while the processing of frames from the receive queue 202 is suspended.

The embedded port 106 loads (at block 704) new port firmware in the embedded port 106, in response to the suspending of the processing of frames from the receive queue 202, and in response to receiving at least one command subsequent to loading of new driver software for the host bus adapter 104. The one command may be a request from the new driver software to the embedded port 106 to load new port firmware. Control proceeds to block 706 in which the new port firmware resumes the processing of frames from the receive queue 202, after the new firmware has been loaded.

Figure 8:
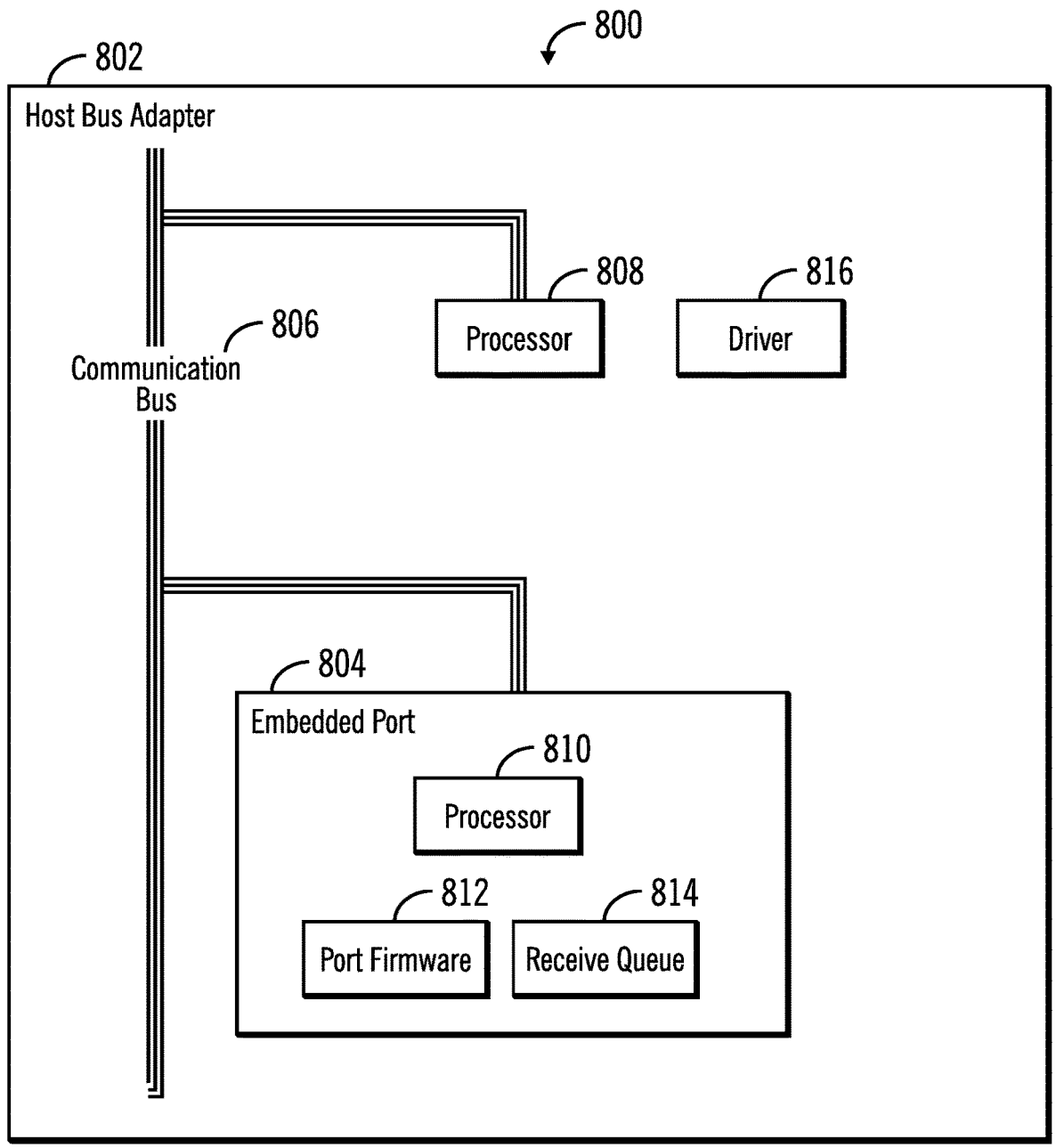
FIG. 8 illustrates a block diagram of a host bus adapter that includes an embedded port within the host bus adapter, in accordance with certain embodiments.

FIG. 8 illustrates a block diagram 800 of a host bus adapter 802 that includes an embedded port 804 within the host bus adapter 802, in accordance with certain embodiments. The host bus adapter 802 includes a communication bus 806 to which a processor 808 and the embedded port 804 are communicatively coupled.

The embedded port 804 includes a processor 810, a port firmware 812, and a receive queue 814 for frames that are received from an external port. The port firmware 812 and the driver 816 of the host bus adapter 802 communicate with each other. Other components not shown in FIG. 8 but shown in FIGS. 1, 2 and other figures may be present in the host bus adapter 802.

Figure 9:
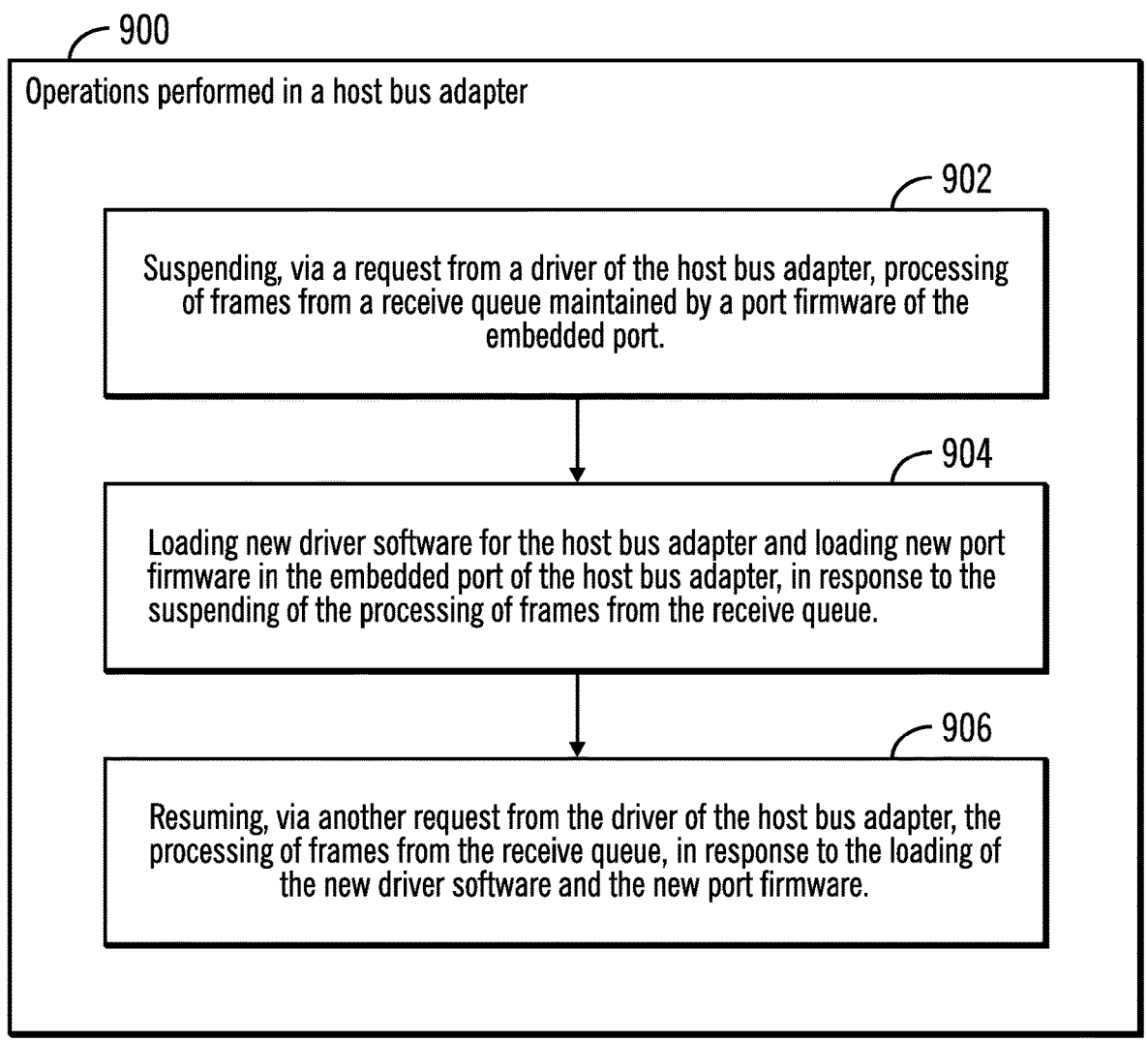
FIG. 9 illustrates a sixth flowchart that shows operations performed in the host bus adapter that includes the embedded port, in accordance with certain embodiments.

FIG. 9 illustrates a sixth flowchart 900 that shows operations performed in the host bus adapter 802 that includes the embedded port 804, in accordance with certain embodiments.

Control starts at block 902 which spending, a suspension is made, via a request from a driver 816 of the host bus adapter 802, of the processing of frames from a receive queue 814 maintained by a port firmware 812 of the embedded port 804. Control proceeds to block 904, in which a new driver software is loaded for the host bus adapter 802, and a new port firmware is loaded in the embedded port 804 of the host bus adapter 802, in response to the suspending of the processing of frames from the receive queue 814.

A resumption is made, via another request from the driver 816 of the host bus adapter 802, of the processing of frames from the receive queue 814, in response to the loading of the new driver software and the new port firmware. Other operations shown in FIGS. 4, 5 and other figures may also be performed in association with the operations shown in FIG. 9.

Figure 10:
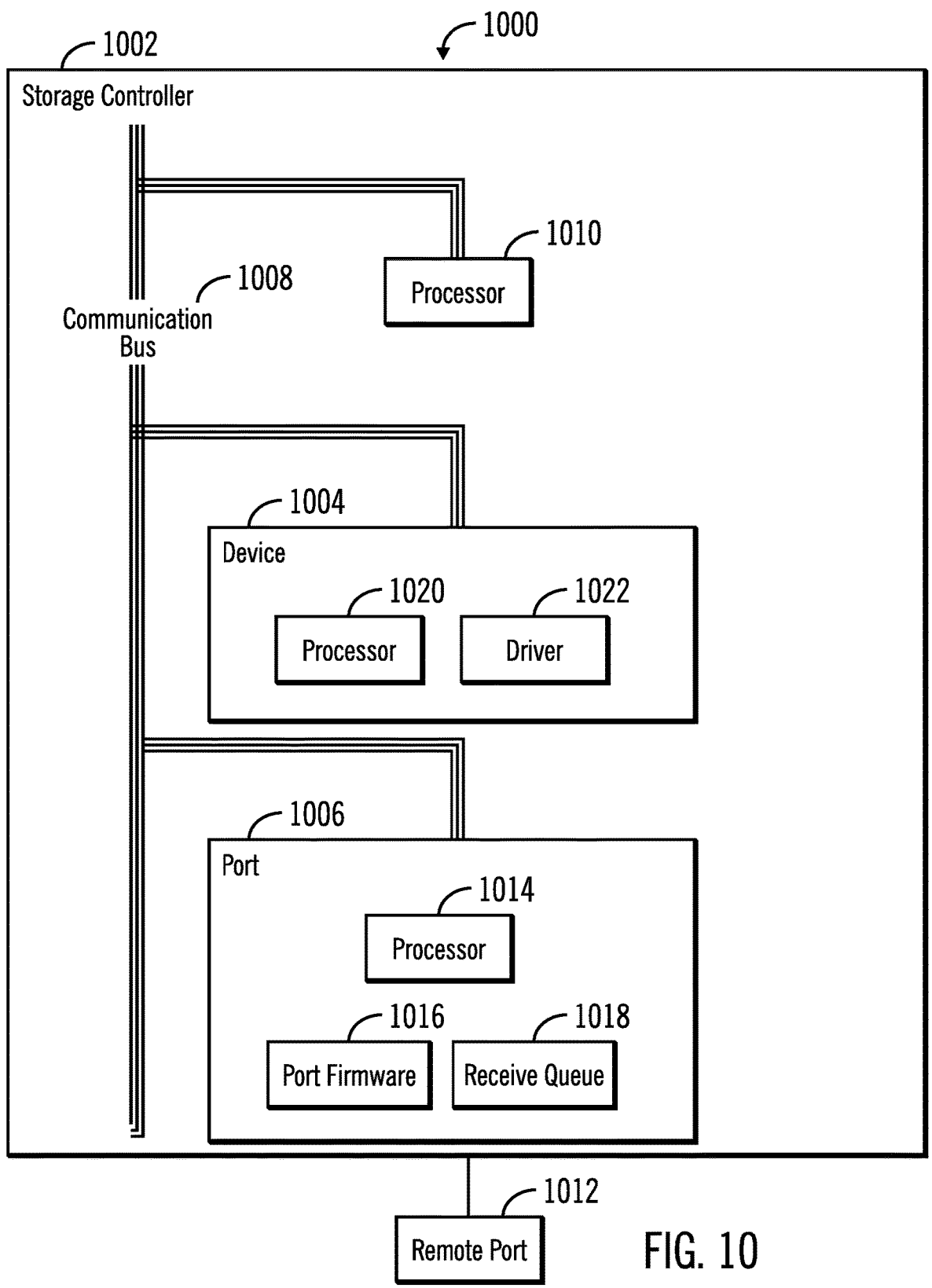
FIG. 10 illustrates a block diagram of a storage controller that includes a device and a port, in accordance with certain embodiments.

FIG. 10 illustrates a block diagram 1000 of a storage controller 1002 that includes a device 1004 and a port 1006, in accordance with certain embodiments. The storage controller 1002 includes a communication bus 1008 to which a processor 1010 of the storage controller 1002, the device 1004, and the port 1006 are communicatively coupled. The port 1006 may be in communication with a remote port 1012.

In certain embodiments the port 1006 includes a processor 1014, a port firmware 1016, and a receive queue 1018 for frames received from the remote port 1012. The device 1004 may have a processor 1020 and a driver 1022 may be associated with the device 1004, and the driver may be internal (as shown in FIG. 10) or external to the device 1004. Other components not shown in FIG. 10 but shown in FIGS. 1, 2 and other figures may be present in the storage controller 1002.

Figure 11:
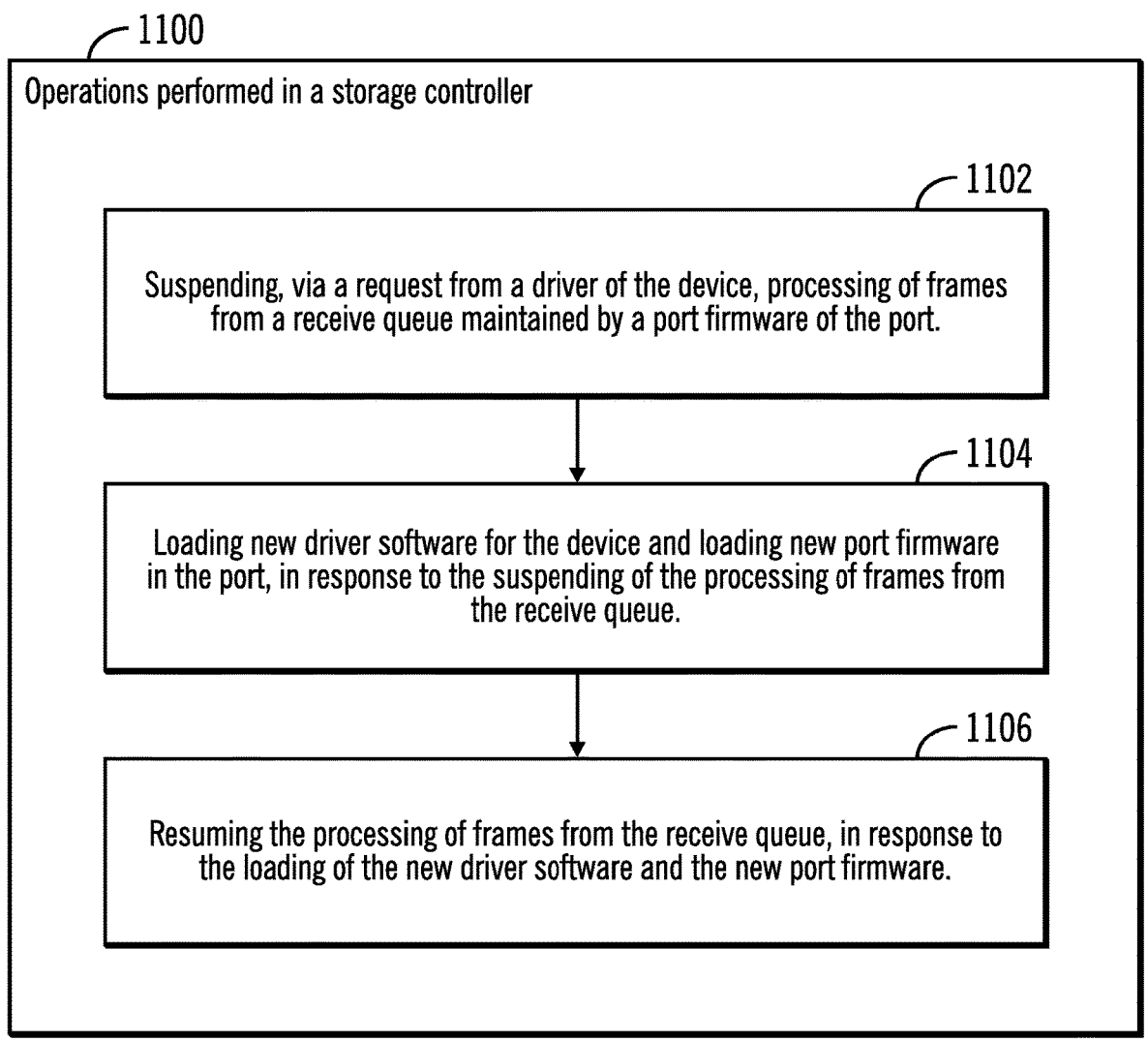
FIG. 11 illustrates a seventh flowchart that shows operations performed in the storage controller that includes the device and the port, in accordance with certain embodiments.

FIG. 11 illustrates a seventh flowchart 1100 that shows operations performed in the storage controller 1002 that includes the device 1004 and the port 1006, in accordance with certain embodiments.

Control starts at block 1102, in which a request via a driver 1022 of the device 1004 suspends the processing of frames from a receive queue 1018 maintained by a port firmware 1016 of the port 1006. New driver software is loaded (at block 1104) for the device 1004, and new port firmware is loaded (at block 1104) in the port 1006, in response to the suspending of the processing of frames from the receive queue 1018. The processing of frames is resumed (at block 1106) from the receive queue 1018, in response to the loading of the new driver software and the new port firmware. Other operations shown in FIGS. 4, 5 and other figures may also be performed in association with the operations shown in FIG. 11.

Figure 12:
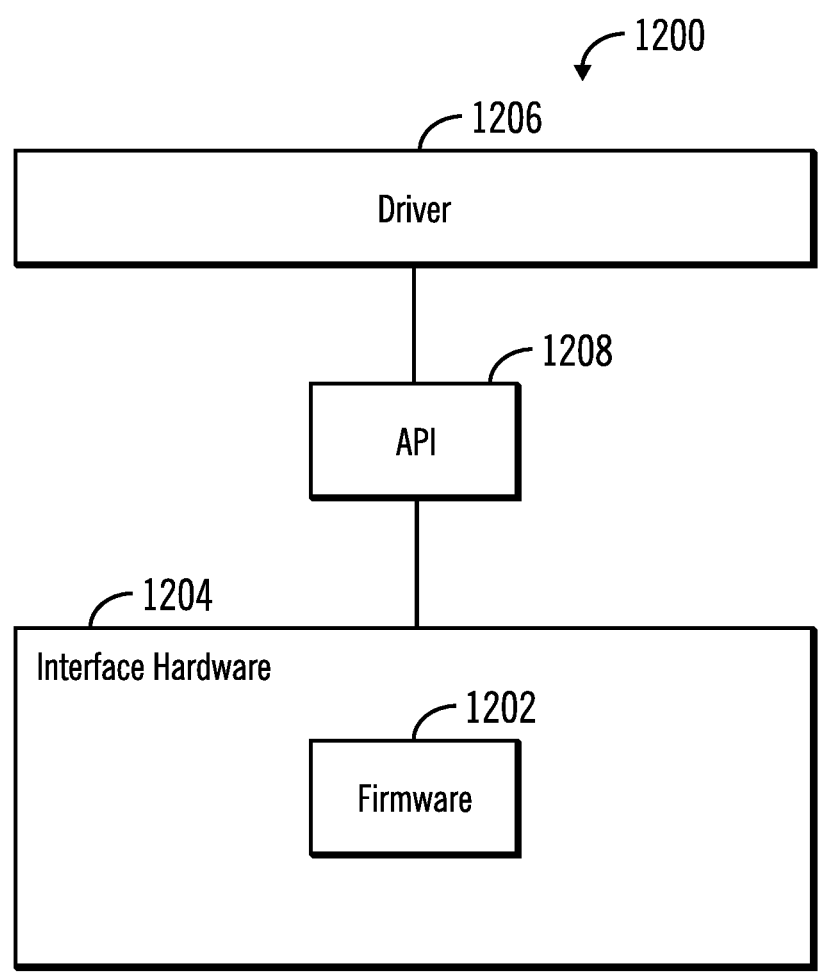
FIG. 12 illustrates a block diagram of a the firmware of an interface hardware communicating with a driver by using an Application Programming Interface (API) designed for the communication, in accordance with certain embodiments.

FIG. 12 illustrates a block diagram 1200 of a the firmware 1202 of an interface hardware 1204 that communicates with a driver 1206 by using an Application Programming Interface (API) 1208 designed for the communication, in accordance with certain embodiments. The API 1208 may be designed and incorporated for communication into the software for the driver 1206 and into the code for the firmware 1202. Other components not shown in FIG. 12 but shown in FIGS. 1, 2 and other figures may be associated with the firmware 1202 and the interface hardware 1204 and the components shown in FIG. 12.

Figure 13:
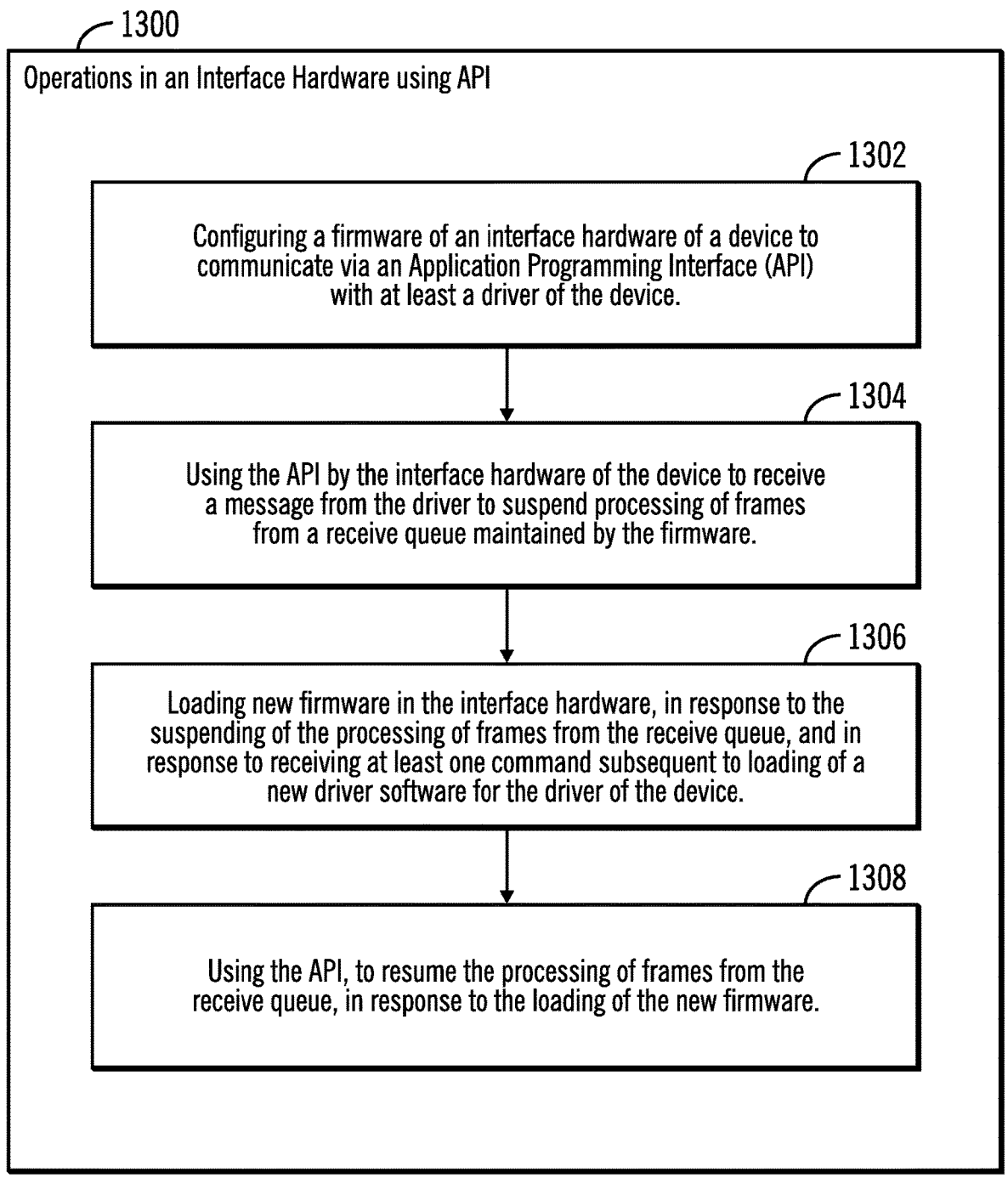
FIG. 13 illustrates a seventh flowchart that shows operations performed in the interface hardware by using the API, in accordance with certain embodiments.

FIG. 13 illustrates a seventh flowchart 1300 that shows operations performed in the interface hardware 1204 by using the API 1208, in accordance with certain embodiments.

Control starts at block 1302 in which a firmware 1202 of an interface hardware 1204 of a device is configured to communicate via an Application Programming Interface (API) 1208 with at least a driver 1206 of the device.

The interface hardware 1204 of the device uses (at block 1304) the API 1208 to receive a message from the driver 1206 to suspend processing of frames from a receive queue maintained by the firmware 1202. New firmware is loaded (at block 1306) in in the interface hardware 1204, in response to the suspending of the processing of frames from the receive queue, and in response to receiving at least one command subsequent to loading of a new driver software for the driver 1206 of the device. The interface hardware 1204 continues to use the API to resume (at block 1308) to resume the processing of frames from the receive queue, in response to the loading of the new firmware. Other operations shown in FIGS. 4, 5 and other figures may also be performed in association with the operations shown in FIG. 12.

Therefore, FIGS. 1-12 illustrate certain embodiments in which remote ports that have previously logged on to a port do not have to perform a new login even if the driver of a device that includes the port and the firmware of the port are changed. The avoidance of new login operations may save a significant amount of time in Fibre Channel based communications in a computing environment.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 14:
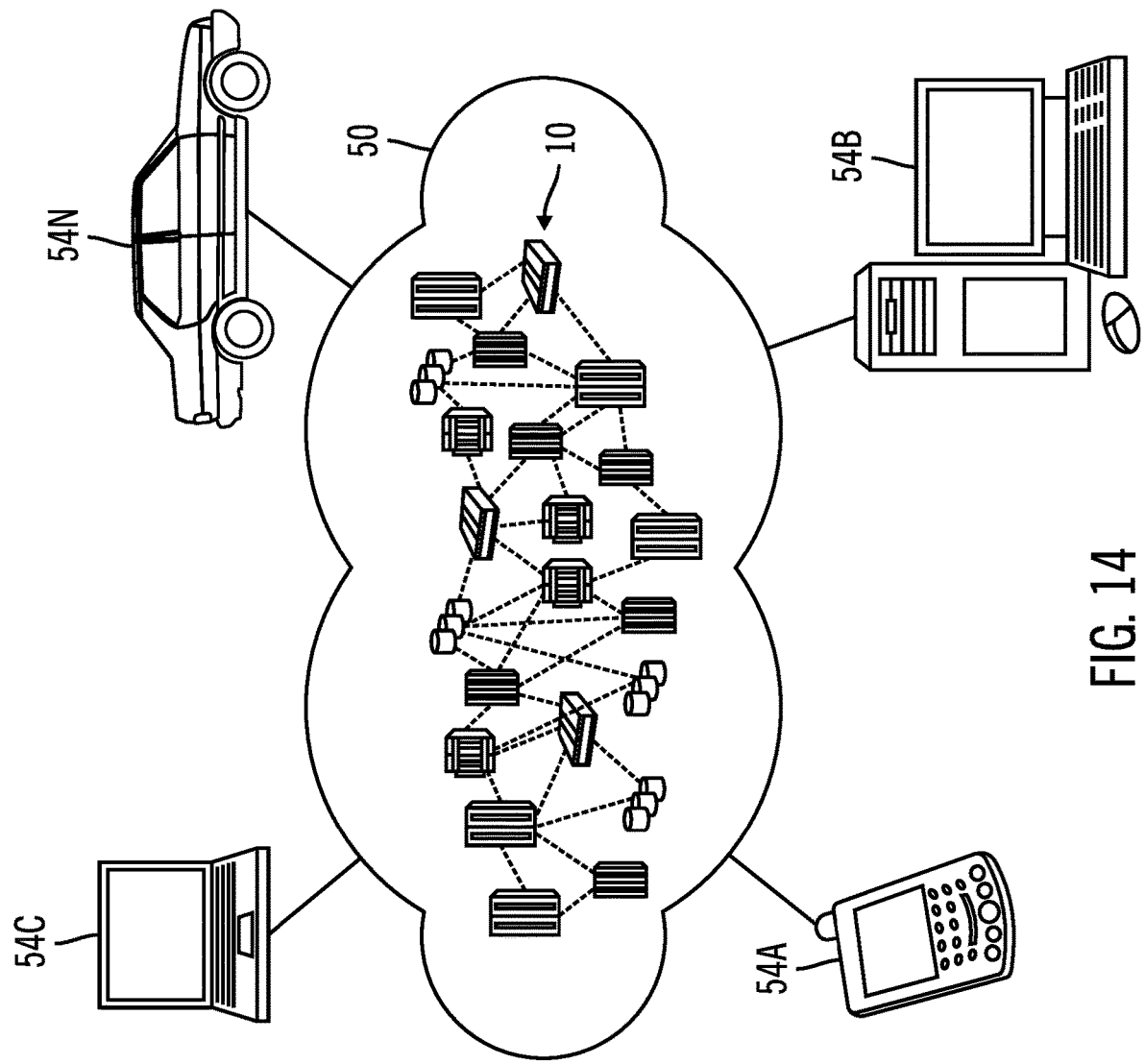
FIG. 14 illustrates a block diagram of a cloud computing environment, in accordance with certain embodiments.

Referring now to FIG. 14, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 14 are intended to be illustrative only and that computing nodes 10 and cloud computing environment 50 can communicate with any type of computerized device over any type of network and/or network addressable connection (e.g., using a web browser).

Figure 15:
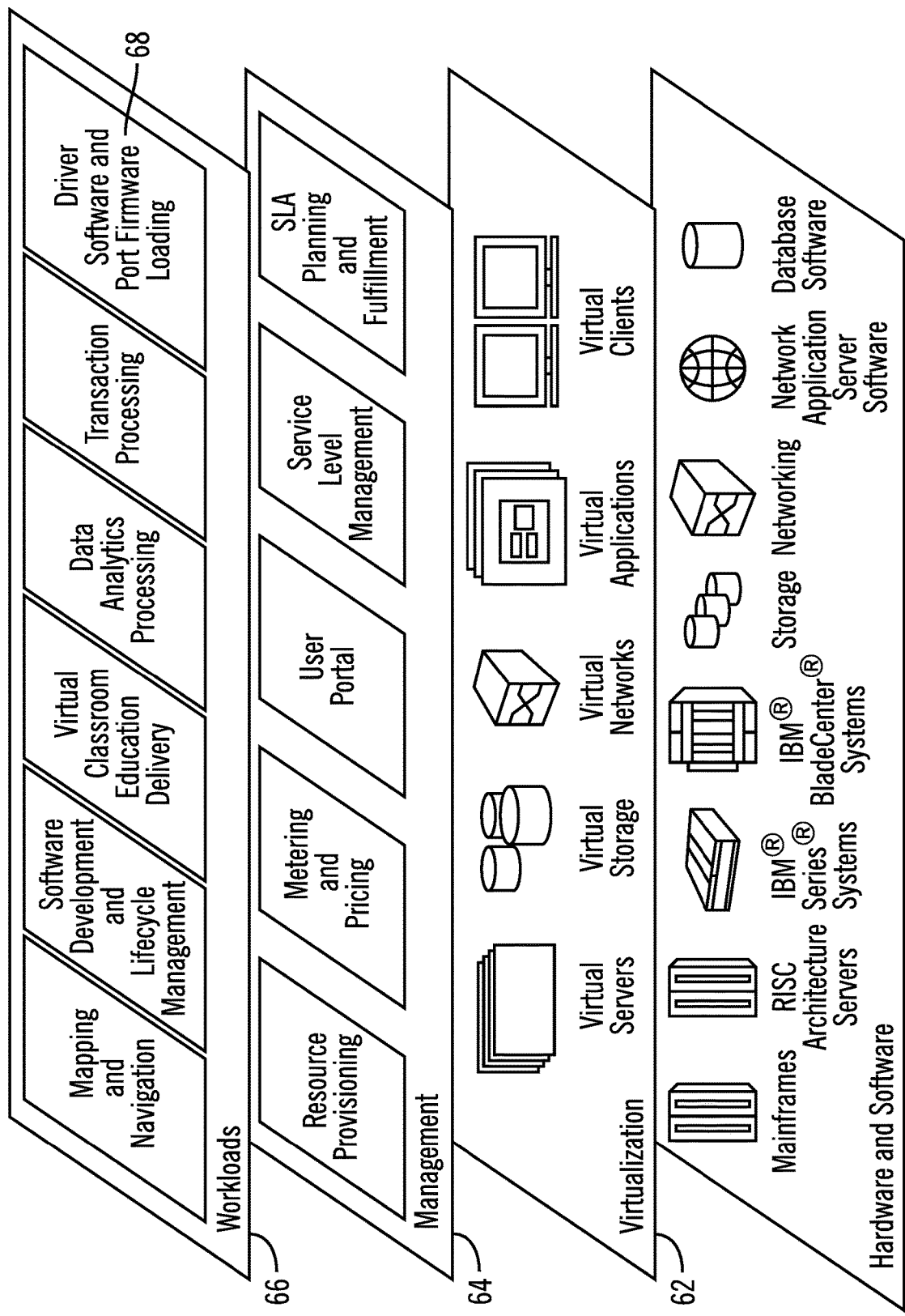
FIG. 15 illustrates a block diagram of further details of the cloud computing environment of FIG. 14, in accordance with certain embodiments.

Referring now to FIG. 15, a set of functional abstraction layers provided by cloud computing environment 50 (FIG. 14) is shown. It should be understood in advance that the components, layers, and functions shown in FIG. 15 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the driver software and port firmware loading 68 as shown in FIGS. 1-14.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 16:
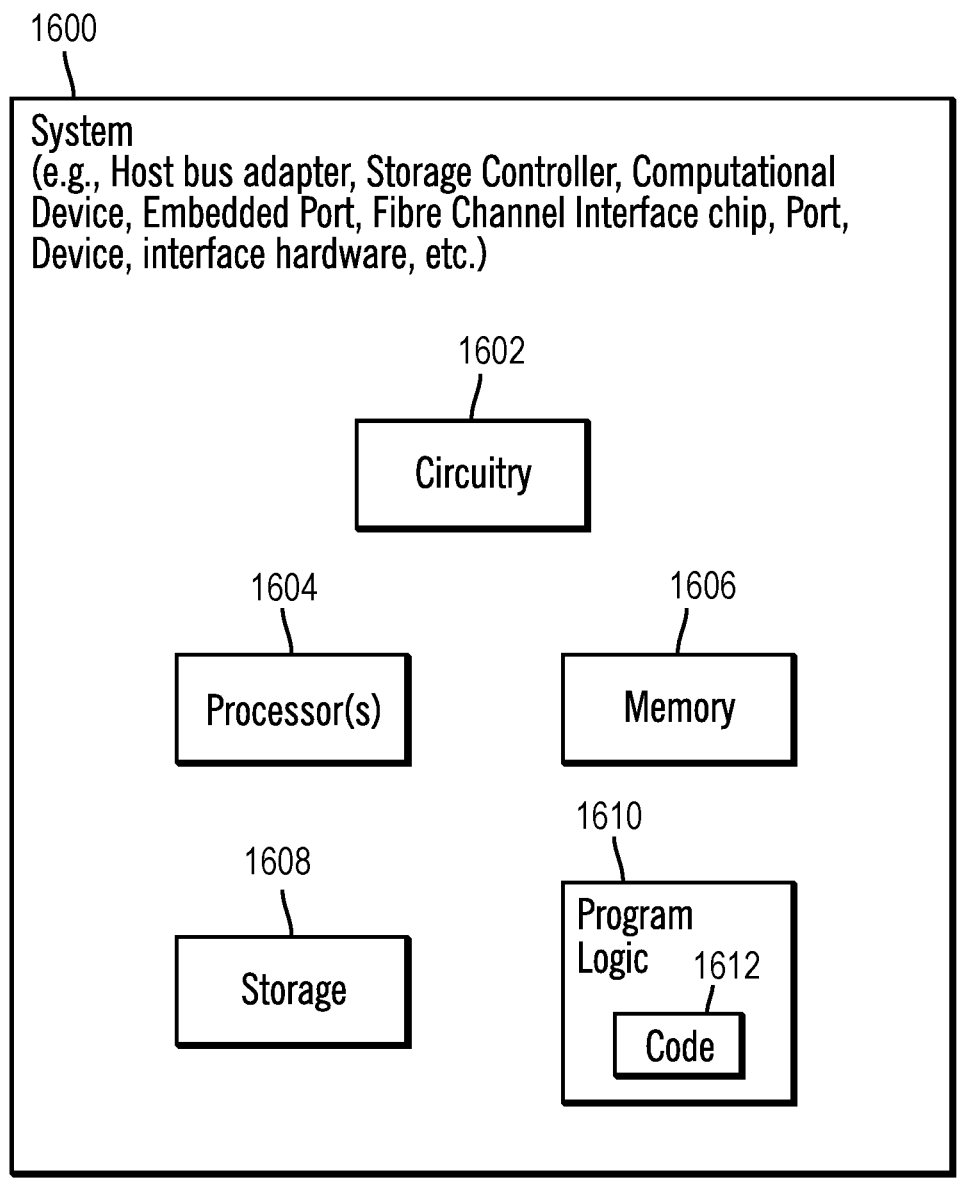
FIG. 16 illustrates a block diagram of a computational system that shows certain elements that may be included in the storage controller, the host bus adapter, the embedded port or Fibre Channel Interface hardware, and/or the host, as described in FIGS. 1-13, in accordance with certain embodiments.

FIG. 16 illustrates a block diagram that shows certain elements that may be included in the host bus adapter 104, 802, the storage controller 102, 1002, the embedded port 106, 804 or Fiber Channel Interface chip/hardware, the device 1004, the port 1006, the interface hardware 1204 or other computational devices in accordance with certain embodiments. The system 1600 may include a circuitry 1602 that may in certain embodiments include at least a processor 1604. The system 1600 may also include a memory 1606 (e.g., a volatile memory device), and storage 1608. The storage 1608 may include a non-volatile memory device (e.g., EEPROM, ROM, PROM, flash, firmware, programmable logic, etc.), magnetic disk drive, optical disk drive, tape drive, etc. The storage 1608 may comprise an internal storage device, an attached storage device and/or a network accessible storage device. The system 1600 may include a program logic 1610 including code 1612 that may be loaded into the memory 1606 and executed by the processor 1604 or circuitry 1602. In certain embodiments, the program logic 1610 including code 1612 may be stored in the storage 1608. In certain other embodiments, the program logic 1610 may be implemented in the circuitry 1602. Therefore, while FIG. 16 shows the program logic 1610 separately from the other elements, the program logic 1610 may be implemented in the memory 1606 and/or the circuitry 1602.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   suspending, via a request from a driver of a host bus adapter, processing of frames by a port firmware of an embedded port that comprises an interface chip included in the host bus adapter;
   in response to the suspending of the processing of frames, storing fabric and host port login states, and subsequent to completion of the storing of the fabric and host port login states, loading new driver software for the driver of the host bus adapter while preserving memory locations allocated for usage by the port firmware; and
   in response to the loading of the new driver software for the host bus adapter, restoring the fabric and host port login states and subsequent to completion of the restoring of the fabric and host port login states, loading new port firmware in the embedded port that comprises the interface chip included in the host bus adapter, wherein the port firmware and the new port firmware support a communications protocol for framing and signaling, wherein remote ports that have previously logged on to the embedded port avoid performing a new login to the embedded port even though the driver of the host bus adapter and the port firmware of the embedded port have changed via the loading of the new driver software and the loading of the new port firmware.

2. The method of claim 1, wherein frame transmission by the embedded port to remote ports is allowed to continue while the processing of frames from a receive queue is suspended.

3. The method of claim 1, the method further comprising:
   saving runtime data prior to loading the new driver software for the host bus adapter; and
   restoring previously saved runtime data subsequent to the loading of the new driver software, and prior to the loading of the new port firmware.

4. The method of claim 1, wherein:
   prior to loading the new driver software and the new port firmware, the driver sends a message to the embedded port to release and free buffer queues that are used to store asynchronous receive data and command payloads for reallocation and resizing, and sends one or more messages to the embedded port to delete additionally configured request and response queues for reallocation and resizing; and
   in response to loading the new driver software and the new port firmware, the driver sends a message to the embedded port to reallocate buffer queues and additional request and response queues.

5. A system, comprising:
   a memory; and
   one or more processors coupled to the memory, wherein the one or more processors perform operations, the operations comprising:
   suspending, via a request from a driver of a host bus adapter, processing of frames by a port firmware of an embedded port that comprises an interface chip included in the host bus adapter;
   in response to the suspending of the processing of frames, storing fabric and host port login states, and subsequent to completion of the storing of the fabric and host port login states, loading new driver software for the driver of the host bus adapter while preserving memory locations allocated for usage by the port firmware; and in response to the loading of the new driver software for the host bus adapter, restoring the fabric and host port login states and subsequent to completion of the restoring of the fabric and host port login states, loading new port firmware in the embedded port that comprises the interface chip included in the host bus adapter, wherein the port firmware and the new port firmware support a communications protocol for framing and signaling, wherein remote ports that have previously logged on to the embedded port avoid performing a new login to the embedded port even though the driver of the host bus adapter and the port firmware of the embedded port have changed via the loading of the new driver software and the loading of the new port firmware.

6. The system of claim 5, wherein frame transmission by the embedded port to remote ports is allowed to continue while the processing of frames from a receive queue is suspended.

7. The system of claim 5, the operations further comprising:

saving runtime data prior to loading the new driver software for the host bus adapter; and restoring previously saved runtime data subsequent to the loading of the new driver software, and prior to the loading of the new port firmware.

8. The system of claim 5, wherein:

prior to loading the new driver software and the new port firmware, the driver send a message to the embedded port to release and free buffer queues that are used to store asynchronous receive data and command payloads for reallocation and resizing, and sends one or more messages to the embedded port to delete additionally configured request and response queues for reallocation and resizing; and in response to loading the new driver software and the new port firmware, the driver sends a message to the embedded port to reallocate buffer queues and additional request and response queues.

9. A computer program product, the computer program product comprising a computer readable storage medium having computer readable program code embodied therewith, the computer readable program code configured to perform operations, the operations comprising:

suspending, via a request from a driver of a host bus adapter, processing of frames by a port firmware of an embedded port that comprises an interface chip included in the host bus adapter;

in response to the suspending of the processing of frames, storing fabric and host port login states, and subsequent to completion of the storing of the fabric and host port login states, loading new driver software for the driver of the host bus adapter while preserving memory locations allocated for usage by the port firmware; and in response to the loading of the new driver software for the host bus adapter, restoring the fabric and host port login states and subsequent to completion of the restoring of the fabric and host port login states, loading new port firmware in the embedded port that comprises the interface chip included in the host bus adapter, wherein the port firmware and the new port firmware support a communications protocol for framing and signaling, wherein remote ports that have previously logged on to the embedded port avoid performing a new login to the embedded port even though the driver of the host bus adapter and the port firmware of the embedded port have changed via the loading of the new driver software and the loading of the new port firmware.

10. The computer program product of claim 9, wherein frame transmission by the embedded port to remote ports is allowed to continue while the processing of frames from a receive queue is suspended.

11. The computer program product of claim 9, the operations further comprising:

saving runtime data prior to loading the new driver software for the host bus adapter; and restoring previously saved runtime data subsequent to the loading of the new driver software, and prior to the loading of the new port firmware.

12. The computer program product of claim 9, wherein:

prior to loading the new driver software and the new port firmware, the driver send a message to the embedded port to release and free buffer queues that are used to store asynchronous receive data and command payloads for reallocation and resizing, and sends one or more messages to the embedded port to delete additionally configured request and response queues for reallocation and resizing; and in response to loading the new driver software and the new port firmware, the driver sends a message to the embedded port to reallocate buffer queues and additional request and response queues.

13. A host bus adapter, comprising:

one or more processors; and an embedded port coupled to the one or more processors, wherein the embedded port comprises an interface chip included in the host bus adapter, and wherein the one or more processors perform operations, the operations comprising:

suspending, via a request from a driver of the host bus adapter, processing of frames by a port firmware of the embedded port that comprises the interface chip included in the host bus adapter;

in response to the suspending of the processing of frames, storing fabric and host port login states, and subsequent to completion of the storing of the fabric and host port login states, loading new driver software for the driver of the host bus adapter while preserving memory locations allocated for usage by the port firmware; and in response to the loading of the new driver software for the host bus adapter, restoring the fabric and host port login states and subsequent to completion of the restoring of the fabric and host port login states, loading new port firmware in the embedded port that comprises the interface chip included in the host bus adapter, wherein the port firmware and the new port firmware support a communications protocol for framing and signaling, wherein remote ports that have previously logged on to the embedded port avoid performing a new login to the embedded port even though the driver of the host bus adapter and the port firmware of the embedded port have changed via the loading of the new driver software and the loading of the new port firmware.

14. The host bus adapter of claim 13, wherein frame transmission by the embedded port to remote ports is allowed to continue while the processing of frames from a receive queue is suspended.

15. The host bus adapter of claim 13, the operations further comprising:

saving runtime data prior to loading the new driver software for the host bus adapter; and restoring previously saved runtime data subsequent to the loading of the new driver software, and prior to the loading of the new port firmware.

16. The host bus adapter of claim 13, the operations further comprising:

prior to loading the new driver software and the new port firmware, the driver sends a message to the embedded port to release and free buffer queues that are used to store asynchronous receive data and command payloads for reallocation and resizing, and sends one or more messages to the embedded port to delete additionally configured request and response queues for reallocation and resizing; and in response to loading the new driver software and the new port firmware, the driver sends a message to the embedded port to reallocate buffer queues and additional request and response queues.

17. A storage controller, comprising:

one or more processors;

a device coupled to the one or more processor; and an embedded port coupled to the one or more processors for communication with a remote port, wherein the processor performs operations, wherein the embedded port comprises an interface chip included in the device, the operations comprising:

suspending, via a request from a driver of the device, processing of frames by a port firmware of the embedded port that comprises the interface chip included in the device;

in response to the suspending of the processing of frames, storing fabric and host port login states, and subsequent to completion of the storing of the fabric and host port login states, loading new driver software for the driver of the device while preserving memory locations allocated for usage by the port firmware; and in response to the loading of the new driver software for the device, restoring the fabric and host port login states and subsequent to completion of the restoring of the fabric and host port login states, loading new port firmware in the embedded port [that comprises the interface chip included in the device, wherein the port firmware and the new port firmware support a communications protocol for framing and signaling, wherein remote ports that have previously logged on to the embedded port avoid performing a new login to the embedded port even though the driver of the device and the port firmware of the embedded port have changed via the loading of the new driver software and the loading of the new port firmware.

18. The storage controller of claim 17 wherein frame transmission by the embedded port to the remote port is allowed to continue while the processing of frames from a receive queue is suspended.

19. The storage controller of claim 17, the operations further comprising:

saving runtime data prior to loading the new driver software for the device; and restoring previously saved runtime data subsequent to the loading of the new driver software, and prior to the loading of the new port firmware.

20. The storage controller of claim 17, the operations further comprising:

prior to loading the new driver software and the new port firmware, the driver sends a message to the embedded port to release and free buffer queues that are used to store asynchronous receive data and command payloads for reallocation and resizing, and sends one or more messages to the embedded port to delete additionally configured request and response queues for reallocation and resizing; and in response to loading the new driver software and the new port firmware, the driver sends a message to the embedded port to reallocate buffer queues and additional request and response queues.

* * * * *